US012712703B2

(12) United States Patent
Manevich et al.

(10) Patent No.: US 12,712,703 B2
(45) **Date of Patent: *Aug. 18, 2026**

(54) CLOCK SYNCHRONIZATION USING DIGITALLY CONTROLLED OSCILLATOR

(71) Applicant: Mellanox Technologies, Ltd., Yokneam (IL)

(72) Inventors: Natan Manevich, Nesher (IL); Dotan David Levi, Kiryat Motzkin (IL); Nir Laufer, Zoran (IL); Wojciech Waśko, Młynek (PL); Maciej Machnikowski, Reda (PL); Doron Fael, Zichron Yaakov (IL); Arnon Sattinger, Zichron Yaakov (IL)

(73) Assignee: Mellanox Technologies, Ltd, Yokneam (IL)

( * ) Notice: Subject to any disclaimer, the term of this patent is extended or adjusted under 35 U.S.C. 154(b) by 197 days.

This patent is subject to a terminal disclaimer.

(21) Appl. No.: 18/420,822

(22) Filed: Jan. 24, 2024

(65) Prior Publication Data

US 2025/0055667 A1 Feb. 13, 2025

Related U.S. Application Data

(63) Continuation-in-part of application No. 18/448,936, filed on Aug. 13, 2023, now Pat. No. 12,289,389.

(51) Int. Cl.
*H04L 7/00* (2006.01)
*H04L 7/04* (2006.01)

(52) U.S. Cl.
CPC .............. *H04L 7/0012* (2013.01); *H04L 7/04* (2013.01)

(58) Field of Classification Search
CPC .......... H04L 7/033; H04L 7/10; H03L 7/0992
See application file for complete search history.

(56) References Cited

U.S. PATENT DOCUMENTS 5,392,421 A 2/1995 Lennartsson
5,402,394 A 3/1995 Turski
(Continued)

FOREIGN PATENT DOCUMENTS

AU 2023200522 B1 4/2023
CN 101059825 A 10/2007
(Continued)

OTHER PUBLICATIONS

IEEE Standard 1588™-2008: "IEEE Standard for a Precision Clock Synchronization Protocol for Networked Measurement and Control Systems", IEEE Instrumentation and Measurement Society, Revision of IEEE Standard 1588-2002, USA, pp. 1-289, Jul. 24, 2008.
(Continued)

*Primary Examiner* — Janice N Tieu
(74) *Attorney, Agent, or Firm* — Meitar Patents LTD.; Daniel Kligler

(57) ABSTRACT

In one embodiment, a system, includes a digitally controlled oscillator (DCO) to generate a local clock signal having a local clock frequency, and a hardware clock to maintain a value indicative of a local clock time advancing at a frequency proportional to the local clock frequency of the local clock signal generated by the DCO, and clock synchronization circuitry to receive from a device an indication of a remote clock time, generate a digital control command to at least partially correct for a difference between the remote clock time and the local clock time, and provide the digital control command to the DCO, wherein the DCO is to adjust the local clock frequency responsively to the digital control command.

23 Claims, 9 Drawing Sheets

(56) References Cited

U.S. PATENT DOCUMENTS 5,416,808 A 5/1995 Witsaman et al.
5,491,792 A 2/1996 Grisham et al.
5,564,285 A 10/1996 Jurewicz et al.
5,592,486 A 1/1997 Lo et al.
5,864,315 A 1/1999 Welles et al.
5,896,524 A 4/1999 Halstead, Jr. et al.
6,055,246 A 4/2000 Jones
6,081,143 A * 6/2000 Ho ........................... G06F 1/12 331/11
6,084,856 A 7/2000 Simmons et al.
6,144,714 A 11/2000 Bleiweiss et al.
6,199,169 B1 3/2001 Voth
6,289,023 B1 9/2001 Dowling et al.
6,339,833 B1 1/2002 Guo
6,449,291 B1 9/2002 Burns et al.
6,535,926 B1 3/2003 Esker
6,556,636 B1 4/2003 Takagi
6,556,638 B1 4/2003 Blackburn
6,718,476 B1 4/2004 Shima
6,918,049 B2 7/2005 Lamb et al.
7,111,184 B2 9/2006 Thomas, Jr. et al.
7,191,354 B2 3/2007 Purho
7,245,627 B2 7/2007 Goldenberg et al.
7,254,646 B2 8/2007 Aguilera et al.
7,334,124 B2 2/2008 Pham et al.
7,412,475 B1 8/2008 Govindarajalu
7,440,474 B1 10/2008 Goldman et al.
7,447,975 B2 11/2008 Riley
7,483,448 B2 1/2009 Bhandari et al.
7,496,686 B2 2/2009 Coyle
7,535,933 B2 5/2009 Zerbe et al.
7,623,552 B2 11/2009 Jordan et al.
7,636,767 B2 12/2009 Lev-Ran et al.
7,650,158 B2 1/2010 Indirabhai
7,656,751 B2 2/2010 Rischar et al.
7,750,685 B1 7/2010 Bunch et al.
7,904,713 B1 3/2011 Zajkowski et al.
7,941,684 B2 5/2011 Serebrin et al.
8,065,052 B2 11/2011 Fredriksson et al.
8,072,313 B2 12/2011 Drucker
8,300,749 B2 10/2012 Hadzic et al.
8,341,454 B1 12/2012 Kondapalli
8,370,675 B2 2/2013 Kagan
8,407,478 B2 3/2013 Kagan et al.
8,607,086 B2 12/2013 Cullimore
8,693,506 B2 4/2014 Hadzic
8,699,406 B1 4/2014 Charles et al.
8,824,903 B2 9/2014 Christensen
8,879,552 B2 11/2014 Zheng
8,930,647 B1 1/2015 Smith
9,344,265 B2 5/2016 Karnes
9,397,960 B2 7/2016 Arad et al.
9,549,234 B1 1/2017 Mascitto
9,753,854 B1 9/2017 Bao
9,942,025 B2 4/2018 Bosch et al.
9,979,998 B1 5/2018 Pogue et al.
10,014,937 B1 7/2018 Di Mola et al.
10,027,601 B2 7/2018 Narkis et al.
10,054,977 B2 8/2018 Mikhaylov et al.
10,095,543 B1 10/2018 Griffin et al.
10,122,527 B1 11/2018 Fischer
10,148,258 B2 12/2018 Carlson et al.
10,164,759 B1 12/2018 Volpe
10,320,646 B2 6/2019 Mirsky et al.
10,515,045 B1 12/2019 Mattina
10,637,776 B2 4/2020 Iwasaki
10,727,966 B1 7/2020 Izenberg et al.
10,778,361 B1 9/2020 Almog et al.
10,778,406 B2 9/2020 Gaist et al.
10,785,015 B1 9/2020 Rada
10,841,243 B2 11/2020 Levi et al.
10,879,910 B1 12/2020 Franck et al.
10,887,077 B1 1/2021 Ivry
10,908,635 B1 2/2021 Ranganathan et al.
11,070,224 B1 7/2021 Faig et al.
11,070,304 B1 7/2021 Levi et al.
11,128,500 B1 9/2021 Mentovich et al.
11,157,433 B2 10/2021 Lederman et al.
11,240,079 B1 2/2022 Kushnir et al.
11,303,363 B1 4/2022 Mohr et al.
11,336,383 B2 5/2022 Mula et al.
11,368,768 B2 6/2022 Bakopoulos et al.
11,379,334 B1 7/2022 Srinivasan et al.
11,388,263 B2 7/2022 Levi et al.
11,476,928 B2 10/2022 Levi et al.
11,539,451 B2 12/2022 Herber et al.
11,552,871 B2 1/2023 Sela et al.
11,606,157 B1 3/2023 Wasko et al.
11,706,014 B1 7/2023 Manevich et al.
11,770,236 B2 9/2023 Moon
11,907,754 B2 2/2024 Wasko et al.
11,917,045 B2 2/2024 Levi et al.
11,962,492 B2 4/2024 Park et al.
2001/0006500 A1 7/2001 Nakajima et al.
2002/0027886 A1 3/2002 Fischer et al.
2002/0031199 A1 3/2002 Rolston et al.
2003/0083814 A1 5/2003 Gronemeyer
2004/0096013 A1 5/2004 Laturell et al.
2004/0153907 A1 8/2004 Gibart
2005/0033947 A1 2/2005 Morris et al.
2005/0100054 A1 * 5/2005 Scott ..................... H04J 3/0632 370/503
2005/0172181 A1 8/2005 Huliehel
2005/0265500 A1 12/2005 Miao
2005/0268183 A1 12/2005 Barmettler
2005/0281367 A1 12/2005 Lesso
2006/0109376 A1 5/2006 Chaffee et al.
2006/0171496 A1 8/2006 Nakamuta et al.
2007/0008044 A1 1/2007 Shimamoto
2007/0072451 A1 3/2007 Tazawa et al.
2007/0104098 A1 5/2007 Kimura et al.
2007/0124415 A1 5/2007 Lev-Ran et al.
2007/0139085 A1 6/2007 Elliot et al.
2007/0159924 A1 7/2007 Vook et al.
2007/0266119 A1 11/2007 Ohly
2008/0069150 A1 3/2008 Badt et al.
2008/0225841 A1 9/2008 Conway et al.
2008/0285597 A1 11/2008 Downey et al.
2009/0167443 A1 7/2009 Liu et al.
2009/0257458 A1 10/2009 Cui et al.
2010/0017139 A1 1/2010 Adams et al.
2010/0280858 A1 11/2010 Bugenhagen
2011/0110360 A1 5/2011 Fenwick et al.
2011/0182191 A1 7/2011 Jackson
2011/0194425 A1 8/2011 Li et al.
2012/0063556 A1 3/2012 Hoang
2012/0076319 A1 3/2012 Terwal
2012/0301134 A1 11/2012 Davari et al.
2013/0039359 A1 2/2013 Bedrosian
2013/0045014 A1 2/2013 Mottahedin et al.
2013/0215889 A1 8/2013 Zheng et al.
2013/0235889 A1 9/2013 Aweya et al.
2013/0282875 A1 10/2013 Aweya et al.
2013/0294144 A1 11/2013 Wang et al.
2013/0315265 A1 11/2013 Webb, III et al.
2013/0336435 A1 12/2013 Akkihal et al.
2014/0085141 A1 3/2014 Geva et al.
2014/0153680 A1 6/2014 Garg et al.
2014/0185216 A1 7/2014 Zeng et al.
2014/0185632 A1 7/2014 Steiner et al.
2014/0210524 A1 7/2014 Roberts
2014/0253387 A1 9/2014 Gunn et al.
2014/0281036 A1 9/2014 Cutler et al.
2014/0301221 A1 10/2014 Nadeau et al.
2014/0321285 A1 10/2014 Chew et al.
2015/0019839 A1 1/2015 Cardinell et al.
2015/0078405 A1 3/2015 Roberts
2015/0092793 A1 4/2015 Aweya
2015/0127978 A1 5/2015 Cui et al.
2015/0131766 A1 * 5/2015 Chen ....................... H03L 7/087 375/372
2015/0163050 A1 6/2015 Han et al.
2015/0318941 A1 11/2015 Zheng et al.
2015/0372681 A1 12/2015 Melanson et al.

(56) References Cited

U.S. PATENT DOCUMENTS

| | | | |
|---|---|---|---|
| 2016/0057518 A1 | 2/2016 | Neudorf | |
| 2016/0072602 A1 | 3/2016 | Earl et al. | |
| 2016/0110211 A1 | 4/2016 | Karnes | |
| 2016/0140066 A1 | 5/2016 | Worrell et al. | |
| 2016/0277138 A1 | 9/2016 | Garg et al. | |
| 2016/0285574 A1 | 9/2016 | White et al. | |
| 2016/0299221 A1 | 10/2016 | Bushnell et al. | |
| 2016/0315756 A1 | 10/2016 | Tenea et al. | |
| 2017/0005903 A1 | 1/2017 | Mirsky | |
| 2017/0017604 A1 | 1/2017 | Chen et al. | |
| 2017/0126589 A1 | 5/2017 | Estabrooks et al. | |
| 2017/0127364 A1 | 5/2017 | Shibuta et al. | |
| 2017/0160933 A1 | 6/2017 | De Jong et al. | |
| 2017/0214516 A1 | 7/2017 | Rivaud et al. | |
| 2017/0302392 A1 | 10/2017 | Farra et al. | |
| 2017/0331926 A1 | 11/2017 | Raveh et al. | |
| 2017/0359137 A1 | 12/2017 | Butterworth et al. | |
| 2018/0059167 A1 | 3/2018 | Sharf et al. | |
| 2018/0098320 A1 | 4/2018 | Gan et al. | |
| 2018/0152286 A1 | 5/2018 | Kemparaj et al. | |
| 2018/0188698 A1 | 7/2018 | Dionne et al. | |
| 2018/0191802 A1 | 7/2018 | Yang et al. | |
| 2018/0227067 A1 | 8/2018 | Hu et al. | |
| 2018/0309654 A1 | 10/2018 | Achkir et al. | |
| 2018/0321358 A1 | 11/2018 | Carswell et al. | |
| 2019/0007189 A1 | 1/2019 | Hossain et al. | |
| 2019/0012278 A1 | 1/2019 | Sindhu et al. | |
| 2019/0014526 A1 | 1/2019 | Bader et al. | |
| 2019/0089615 A1 | 3/2019 | Branscomb et al. | |
| 2019/0149258 A1 | 5/2019 | Araki et al. | |
| 2019/0158909 A1 | 5/2019 | Kulkarni et al. | |
| 2019/0196563 A1 | 6/2019 | Lai | |
| 2019/0205272 A1 | 7/2019 | Fodor et al. | |
| 2019/0220300 A1 | 7/2019 | Rosenboom | |
| 2019/0265997 A1 | 8/2019 | Merrill et al. | |
| 2019/0273571 A1 | 9/2019 | Bordogna et al. | |
| 2019/0319729 A1 | 10/2019 | Leong et al. | |
| 2019/0349392 A1 | 11/2019 | Wetterwald et al. | |
| 2019/0379714 A1 | 12/2019 | Levi et al. | |
| 2020/0044657 A1 | 2/2020 | Pi et al. | |
| 2020/0162234 A1 | 5/2020 | Almog et al. | |
| 2020/0235905 A1 | 7/2020 | Su et al. | |
| 2020/0266967 A1 | 8/2020 | Fisher et al. | |
| 2020/0287557 A1* | 9/2020 | Horovitz | H03L 7/10 |
| 2020/0304224 A1 | 9/2020 | Neugeboren | |
| 2020/0331480 A1 | 10/2020 | Zhang et al. | |
| 2020/0344333 A1 | 10/2020 | Hawari et al. | |
| 2020/0396050 A1 | 12/2020 | Perras et al. | |
| 2020/0401434 A1 | 12/2020 | Thampi et al. | |
| 2021/0006344 A1 | 1/2021 | Chen et al. | |
| 2021/0141413 A1 | 5/2021 | Levi et al. | |
| 2021/0175991 A1 | 6/2021 | Neugeboren | |
| 2021/0218431 A1 | 7/2021 | Narayanan et al. | |
| 2021/0243140 A1 | 8/2021 | Levi et al. | |
| 2021/0288785 A1 | 9/2021 | Faig et al. | |
| 2021/0297151 A1 | 9/2021 | Levi et al. | |
| 2021/0297230 A1 | 9/2021 | Dror et al. | |
| 2021/0318978 A1 | 10/2021 | Hsung | |
| 2021/0328900 A1 | 10/2021 | Sattinger et al. | |
| 2021/0392065 A1 | 12/2021 | Sela et al. | |
| 2021/0409031 A1 | 12/2021 | Ranganathan et al. | |
| 2021/0409137 A1 | 12/2021 | Mula et al. | |
| 2022/0006606 A1 | 1/2022 | Levi et al. | |
| 2022/0021393 A1 | 1/2022 | Ravid et al. | |
| 2022/0045768 A1 | 2/2022 | Cingoz et al. | |
| 2022/0066978 A1 | 3/2022 | Mishra et al. | |
| 2022/0086105 A1 | 3/2022 | Levi et al. | |
| 2022/0116473 A1 | 4/2022 | Levi et al. | |
| 2022/0121691 A1 | 4/2022 | Barathi | |
| 2022/0173741 A1 | 6/2022 | Ravid et al. | |
| 2022/0191275 A1 | 6/2022 | Levi et al. | |
| 2022/0224500 A1 | 7/2022 | Mula et al. | |
| 2022/0239549 A1 | 7/2022 | Zhao et al. | |
| 2022/0240108 A1 | 7/2022 | Ruelke et al. | |
| 2022/0261032 A1 | 8/2022 | Bateni | |
| 2022/0337683 A1 | 10/2022 | Biederman et al. | |
| 2022/0342086 A1 | 10/2022 | Yoshida | |
| 2022/0345290 A1 | 10/2022 | Matsumoto | |
| 2022/0345417 A1 | 10/2022 | Kasichainula et al. | |
| 2022/0352998 A1 | 11/2022 | Levi et al. | |
| 2022/0357763 A1 | 11/2022 | Levy et al. | |
| 2022/0360423 A1 | 11/2022 | Levi et al. | |
| 2022/0385598 A1 | 12/2022 | Pismenny et al. | |
| 2022/0416925 A1 | 12/2022 | Levi et al. | |
| 2023/0076889 A1 | 3/2023 | Rabinovich et al. | |
| 2023/0077631 A1 | 3/2023 | Biederman et al. | |
| 2023/0082780 A1 | 3/2023 | Sun et al. | |
| 2023/0110161 A1 | 4/2023 | Nadeau-Dostie et al. | |
| 2023/0133374 A1 | 5/2023 | Müller et al. | |
| 2023/0185600 A1 | 6/2023 | Wasko et al. | |
| 2023/0189242 A1 | 6/2023 | Aronkyto | |
| 2023/0195161 A1 | 6/2023 | Shiga et al. | |
| 2023/0236624 A1 | 7/2023 | Levi et al. | |
| 2023/0251899 A1 | 8/2023 | Levi et al. | |
| 2023/0341889 A1 | 10/2023 | Elliott | |
| 2023/0353635 A1 | 11/2023 | Karumbunathan et al. | |
| 2023/0361900 A1 | 11/2023 | Levi et al. | |
| 2023/0362096 A1 | 11/2023 | Manevich et al. | |
| 2023/0367358 A1 | 11/2023 | Manevich et al. | |
| 2023/0370305 A1 | 11/2023 | Manevich et al. | |
| 2024/0031124 A1 | 1/2024 | Levi et al. | |
| 2024/0163000 A1 | 5/2024 | Argawal et al. | |
| 2024/0223603 A1 | 7/2024 | Lesi et al. | |
| 2024/0224205 A1 | 7/2024 | Machireddy | |
| 2024/0421930 A1 | 12/2024 | Yamagata et al. | |
| 2025/0021130 A1 | 1/2025 | Manevich et al. | |
| 2025/0055668 A1 | 2/2025 | Manevich et al. | |
| 2025/0085739 A1 | 3/2025 | Ma et al. | |
| 2025/0208647 A1 | 6/2025 | Ming et al. | |
| 2025/0240110 A1 | 7/2025 | Manevich et al. | |
| 2025/0278568 A1 | 9/2025 | Jain et al. | |
| 2025/0301309 A1 | 9/2025 | Han et al. | |
| 2025/0323743 A1 | 10/2025 | Manevich et al. | |

FOREIGN PATENT DOCUMENTS

| | | | |
|---|---|---|---|
| CN | 101388741 | A | 3/2009 |
| CN | 203596827 | U | 5/2014 |
| CN | 106817183 | A | 6/2017 |
| CN | 108667547 | A | 10/2018 |
| CN | 108829493 | A | 11/2018 |
| CN | 110581744 | A | 12/2019 |
| CN | 114513293 | A | 5/2022 |
| CN | 114647179 | A | 6/2022 |
| CN | 115189796 | A | 10/2022 |
| EP | 1215559 | B1 | 9/2007 |
| EP | 2770678 | A1 | 8/2014 |
| JP | 2011091676 | A | 5/2011 |
| TW | 498259 | B | 8/2002 |
| WO | 2012007276 | A1 | 1/2012 |
| WO | 2013124782 | A2 | 8/2013 |
| WO | 2013143112 | A1 | 10/2013 |
| WO | 2014029533 | A1 | 2/2014 |
| WO | 2014138936 | A1 | 9/2014 |

OTHER PUBLICATIONS

Weibel et al., "Implementation and Performance of Time Stamping Techniques", 2004 Conference on IEEE 1588, pp. 1-29, Sep. 28, 2004.

Working Draft Project American National Standard T10/1799-D, "Information Technology—SCSI Block Commands—3 (SBC-3)", pp. 1-220, Revision 19, May 29, 2009.

"Infiniband Architecture: Specification vol. 1", pp. 1-1727, Release 1.2.1, Infiniband Trade Association, Nov. 2007.

Mellanox Technologies, "Mellanox ConnectX IB: Dual-Port InfiniBand Adapter Cards with PCI Express 2.0", pp. 1-2, USA, year 2008.

Wikipedia—"Precision Time Protocol", pp. 1-8, Aug. 24, 2019.

IEEE Std 1588-2002, "IEEE Standard for a Precision Clock Synchronization Protocol for Networked Measurement and Control Systems", IEEE Instrumentation and Measurement Society, pp. 1-154, Nov. 8, 2002.

(56) References Cited

OTHER PUBLICATIONS

Weibel, H., "High Precision Clock Synchronization according to IEEE 1588 Implementation and Performance Issues", Zurich University of Applied Sciences, pp. 1-9, Jan. 17, 2005.
Lu et al., "A Fast CRC Update Implementation", Computer Engineering Laboratory, Electrical Engineering Department, pp. 113-120, Oct. 8, 2003.
Texas Instruments, "LMK05318 Ultra-Low Jitter Network Synchronizer Clock With Two Frequency Domains," Product Folder, pp. 1-86, Dec. 2018.
Dlugy-Hegwer et al., "Designing and Testing IEEE 1588 Timing Networks", Symmetricom, pp. 1-10, Jan. 2007.
Mellanox Technologies, "How to test 1PPS on Mellanox Adapters", pp. 1-6, Oct. 22, 2019 downloaded from https://community.mellanox.com/s/article/How-To-Test-1PPS-on-Mellanox-Adapters.
ITU-T recommendation, "G.8273.2/Y.1368.2—Timing characteristics of telecom boundary clocks and telecom time slave clocks", pp. 1-50, Jan. 2017.
ITU-T Standard G.8262/Y.1362, "Timing characteristics of synchronous equipment slave clock", pp. 1-44, Nov. 2018.
Ipclock, "IEEE 1588 Primer," ip-clock.com, pp. 1-3, May 1, 2017 (downloaded from https://web.archive.org/web/20170501192647/http://ip-clock.com/ieee-1588-primer/).
ITU-T Standard G.8261/Y.1361, "Timing and synchronization aspects in packet networks", pp. 1-120, Aug. 2019.
ITU-T Standard G.8264/Y.1364, "Distribution of timing information through packet networks", pp. 1-42, Aug. 2017.
"Precision Time Protocol," PTP Clock Types, CISCO, pp. 1-52, Jul. 30, 2020, as downloaded from https://www cisco.com/c/en/us/td/docs/dcn/aci/apic/5x/system-management-configuration/cisco-apic-system-management-configuration-guide-52x/m-precision-time-protocol.pdf.
U.S. Appl. No. 18/111,916 Office Action dated Jun. 5, 2024.
Obleukhov et al., "Simple Precision Time Protocol at Meta," pp. 1-15, Feb. 7, 2024, as downloaded from https://engineering.fb.com/2024/02/07/production-engineering/simple-precision-time-protocol-sptp-meta/.
Behn, "meinberg-sync / flashptpd," Meinberg Funkuhren GmbH & Co. KG, pp. 1-6, year 2023.
Arnold et al., "Enterprise Profile for the Precision Time Protocol with Mixed Multicast and Unicast Messages," Internet Engineering Task Force (IETF), TICTOC Workgroup, Internet Draft, pp. 1-13, Nov. 23, 2023.
Wikipedia, "Network Time Protocol," pp. 1-20, last edited Mar. 31, 2024.
Silicon Laboratories Inc., "Temperature-Compensated Oscillator Example," AN365, Rev. 0.1, pp. 1-8, Nov. 9, 2009.
Sutton et al., "Reinforcement Learning," Chapter 6.6—"Actor-Critic Methods," The MIT Press, e-book, pp. 1-3, Jan. 4, 2005, as downloaded from incompleteideas.net/book/first/ebook/node66.html.
ITU-T Recommendation, "G.8262.1/Y.1362.1—Series G: Transmission Systems and Media, Digital Systems and Networks—Packet over Transport Aspects—Synchronization, Quality and Availability Targets Series Y: Global Information Infrastructure, Internet Protocol Aspects, Next-Generation Networks, Internet of Things and Smart Cities—Timing Characteristics of Enhanced Synchronous Equipment Slave Clock," pp. 1-26, Jan. 2019.
Wasko et al., U.S. Appl. No. 18/111,916, filed Feb. 21, 2023.
Manevich et al., U.S. Appl. No. 18/349,976, filed Jul. 11, 2023.
Corbett et al., "Spanner: Google's Globally Distributed Database," ACM Transactions on Computer Systems, vol. 31, No. 3, article 8, pp. 1-22, Aug. 2013.
SiTime Corporation, "Sit5377—60 to 220 MHz, ±100 ppb Elite RF™ Super-TCXO," Product Description, pp. 1-3, last updated Mar. 18, 2023 as downloaded from https://web.archive.org/web/20230318094421/https://www.sitime.com/products/super-toxos/sit5377.
PCI-SIG, "PCI Express®—Base Specification—Revision 3.0," pp. 1-860, Nov. 10, 2010.
Manevich et al., U.S. Appl. No. 18/448,936, filed Aug. 13, 2023.
CN Application # 202210456108.6 Office Action dated Aug. 30, 2024.
Zhang et al., "TI BAW technology enables ultra-low jitter clocks for highspeed networks", White paper, Texas Instruments, pp. 1-11, Feb. 2019.
Skywork Solutions Inc., "PCI Express 3.1 Jitter Requirements", AN562, pp. 1-16, year 2021.
Intel, "Can Altera GX/GT/GZ device high speed transceivers handle Spread Spectrum Clocking (SSC), as required by PCIe or SATA/SAS protocols?", p. 1, Sep. 11, 2012.
Shapira et al., U.S. Appl. No. 17/534,776, filed Nov. 24, 2021.
Shapira et al., U.S. Appl. No. 17/578,115, filed Jan. 18, 2022.
Kernen et al., U.S. Appl. No. 17/858,236, filed Jul. 6, 2022.
"IEEE Standard for Local and Metropolitan Area Networks—Timing and Synchronization for Time-Sensitive Applications," IEEE Std 802.1AS-2020, IEEE Computer Society, pp. 1-421, year 2020.
Manevich et al., U.S. Appl. No. 18/067,767, filed Dec. 19, 2022.
List of references cited by examiner, U.S. Appl. No. 18/418,276, dated Feb. 17, 2026.
List of references cited by examiner, U.S. Appl. No. 18/349,976, dated Sep. 24, 2025.
List of references cited by examiner, U.S. Appl. No. 18/470,452, dated Oct. 24, 2025.
Non-Final Office Action, U.S. Appl. No. 18/470,452, dated Oct. 24, 2025.
Non-Final Office Action, U.S. Appl. No. 18/349,976, dated Sep. 24, 2025.
Non-Final Office Action, U.S. Appl. No. 18/418,276, dated Feb. 17, 2026.
List of References cited by the Examiner, U.S. Appl. No. 81/624,169, dated Sep. 5, 2025.
Non-Final Office Action, U.S. Appl. No. 18/624,169, dated Sep. 5, 2025.
Stanton et al., "Precision Time in the Last Centimeters for Distributed Applications," 2024 IEEE ISPCS, Tokyo, Japan, 2024, pp. 1-6, doi: 10.1109/ISPCS63021.2024.10747729.
Stanton, "Distributing Deterministic, Accurate Time for Tightly Coordinated Network and Software Applications: IEEE 802.1AS, the TSN Profile of Ptp," IEEE Communications Standards Magazine, vol. 2, No. 2, pp. 34-40, Jun. 2018, doi: 10.1109/MCOMSTD.2018.1700086.
Non Final Office Action, U.S. Appl. No. 18/964,450, dated Apr. 3, 2026.
Notice of References Cited, U.S. Appl. No. 18/964,450, dated Apr. 3, 2026.
Non Final Office Action, U.S. Appl. No. 18/631,095, dated Apr. 9, 2026.
Notice of References Cited, U.S. Appl. No. 18/631,095, dated Apr. 9, 2026.
Non Final Office Action, U.S. Appl. No. 18/664,340, dated Jun. 15, 2026.
List of References Cited, U.S. Appl. No. 18/664,340, dated Jun. 15, 2026.

* cited by examiner 10
18
46
12,14
52
CHAINED DEVICE
54
DCO
LOCAL CLOCK
NETWORK ADAPTER BOARD
46
CORE PLL
20
50
24
LOCAL CLOCK
HARDWARE CLOCK
PPS OUT
22
PPS IN
DIGITAL CONTROL CHANNEL
CLOCK SYNC. CIRCUITRY
48
28
CLOCK CHAINING LOGIC
COUNTER(S)
CLOCK IN
56
32
44
CLOCK OUT
30
FIRMWARE CONTROLLER
60
34
NETWORK INTERFACE
42
COUNTER(S)
SERDES PLL
PORTS
36
NETWORK ADAPTER CHIP
26
16
16
16
38
CHAINED DEVICE
58
40
DEVICE
62

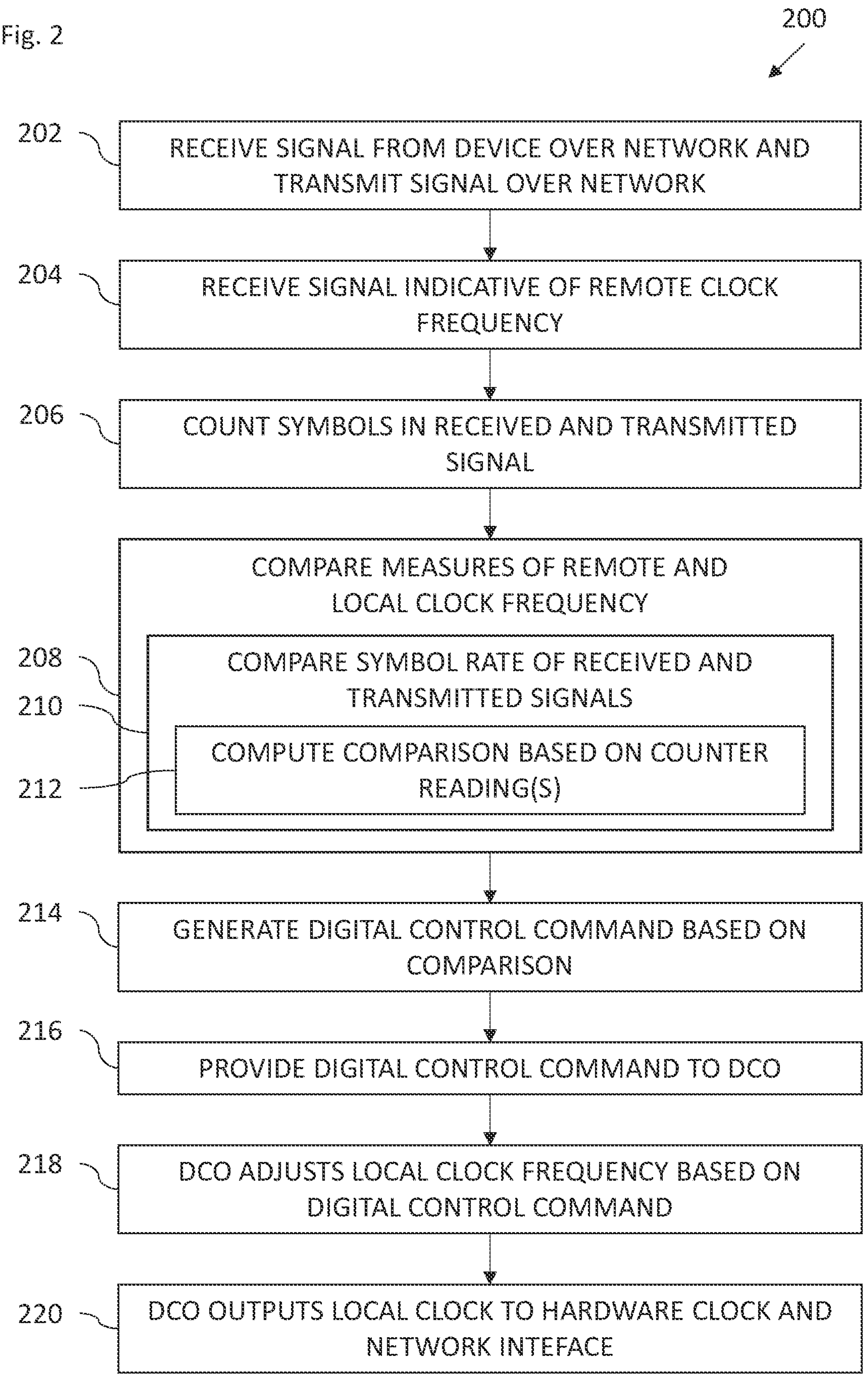

Fig. 2
200
202
RECEIVE SIGNAL FROM DEVICE OVER NETWORK AND TRANSMIT SIGNAL OVER NETWORK
204
RECEIVE SIGNAL INDICATIVE OF REMOTE CLOCK FREQUENCY
206
COUNT SYMBOLS IN RECEIVED AND TRANSMITTED SIGNAL
COMPARE MEASURES OF REMOTE AND LOCAL CLOCK FREQUENCY
208
COMPARE SYMBOL RATE OF RECEIVED AND TRANSMITTED SIGNALS
210
COMPUTE COMPARISON BASED ON COUNTER READING(S)
212
214
GENERATE DIGITAL CONTROL COMMAND BASED ON COMPARISON
216
PROVIDE DIGITAL CONTROL COMMAND TO DCO
218
DCO ADJUSTS LOCAL CLOCK FREQUENCY BASED ON DIGITAL CONTROL COMMAND
220
DCO OUTPUTS LOCAL CLOCK TO HARDWARE CLOCK AND NETWORK INTEFACE

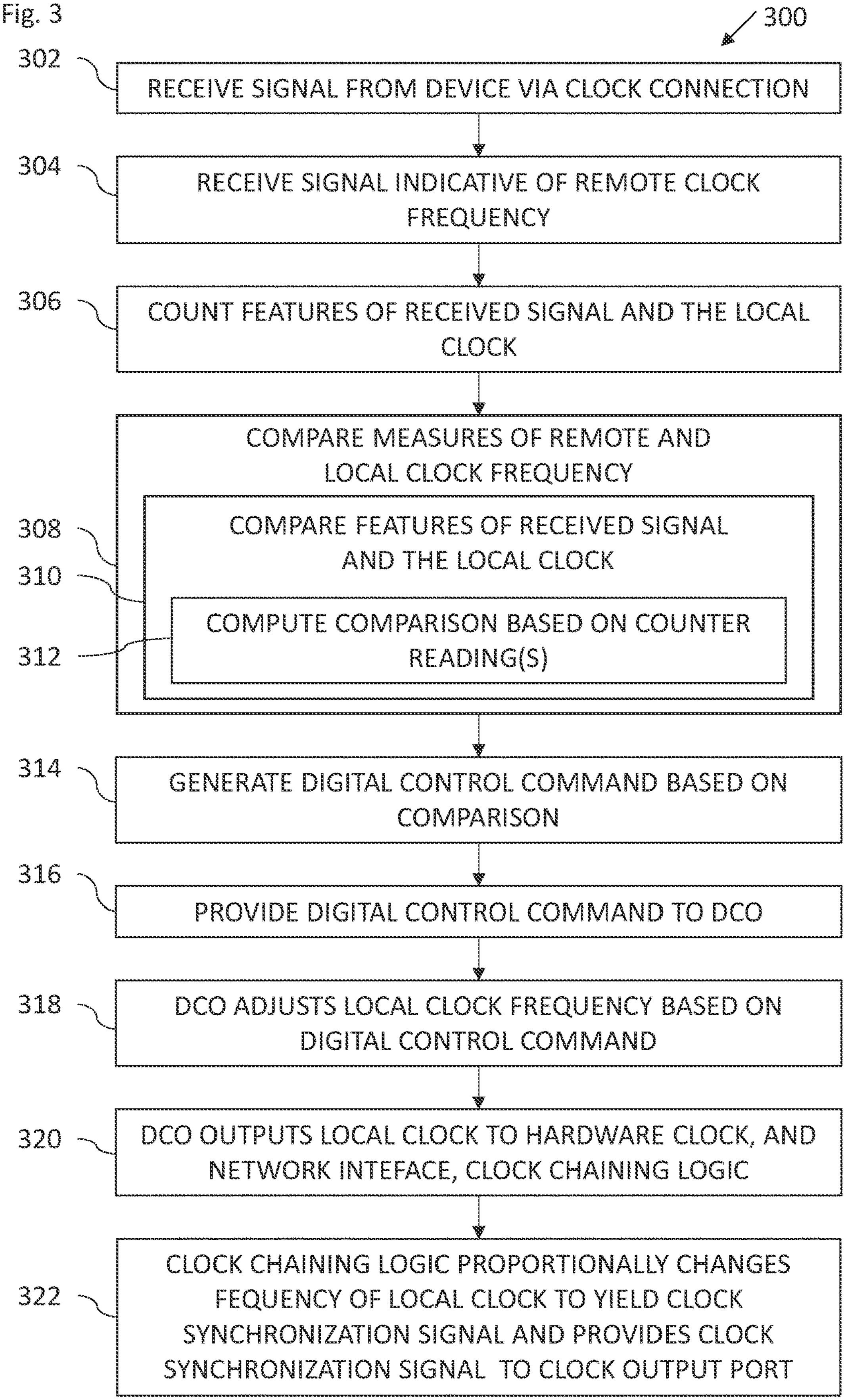

Fig. 3
300
302
RECEIVE SIGNAL FROM DEVICE VIA CLOCK CONNECTION
304
RECEIVE SIGNAL INDICATIVE OF REMOTE CLOCK FREQUENCY
306
COUNT FEATURES OF RECEIVED SIGNAL AND THE LOCAL CLOCK
COMPARE MEASURES OF REMOTE AND LOCAL CLOCK FREQUENCY
308
COMPARE FEATURES OF RECEIVED SIGNAL AND THE LOCAL CLOCK
310
COMPUTE COMPARISON BASED ON COUNTER READING(S)
312
314
GENERATE DIGITAL CONTROL COMMAND BASED ON COMPARISON
316
PROVIDE DIGITAL CONTROL COMMAND TO DCO
318
DCO ADJUSTS LOCAL CLOCK FREQUENCY BASED ON DIGITAL CONTROL COMMAND
320
DCO OUTPUTS LOCAL CLOCK TO HARDWARE CLOCK, AND NETWORK INTEFACE, CLOCK CHAINING LOGIC
322
CLOCK CHAINING LOGIC PROPORTIONALLY CHANGES FEQUENCY OF LOCAL CLOCK TO YIELD CLOCK SYNCHRONIZATION SIGNAL AND PROVIDES CLOCK SYNCHRONIZATION SIGNAL TO CLOCK OUTPUT PORT 64
400
HOST DEVICE
PROCESSOR
68
CLOCK SYNCHRONIZATION SOFTWARE
66
22
CLOCK SYNC. CIRCUITRY
80
FREQ. ADJ.
NETWORK ADAPTER BOARD
18
DCO
DIGITAL CC
32
16
78
30
FIRMWARE/ HARDWARE CONTROLLER
46
LOCAL CLOCK
NETWORK ADAPTER CHIP
PTP
70
74
20
46
CORE PLL
PACKET PROCESSING CIRCUITRY
72
LOCAL CLOCK
HARD WARE CLOCK
PACKET TIMESTAMPER
24
26
NETWORK INTERFACE
SERDES PLL
PORTS
36
PPS IN
34
48
12,14
38
PTP
74
76
40
DEVICE
GNSS

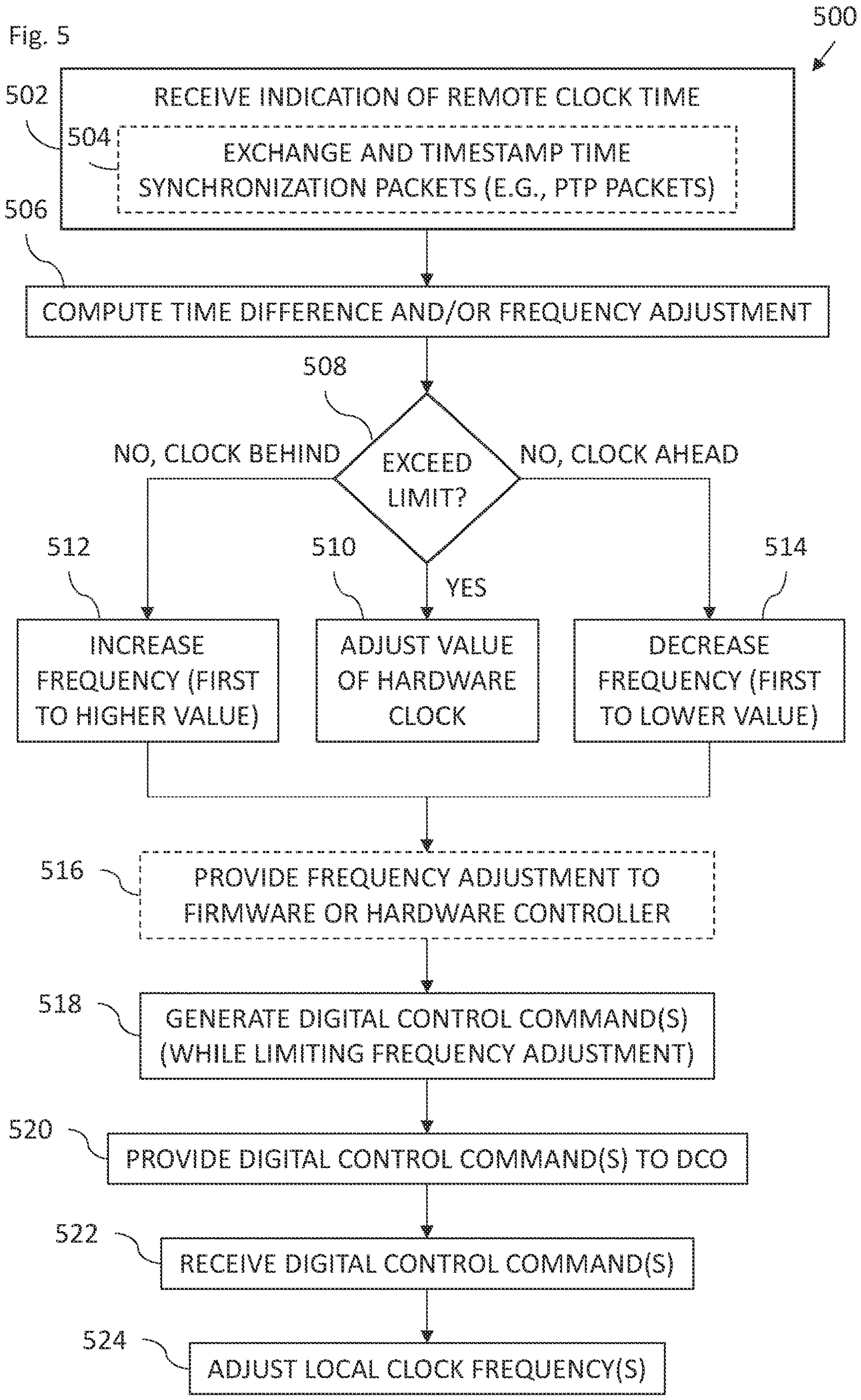

Fig. 5
500
502
RECEIVE INDICATION OF REMOTE CLOCK TIME
504
EXCHANGE AND TIMESTAMP TIME SYNCHRONIZATION PACKETS (E.G., PTP PACKETS)
506
COMPUTE TIME DIFFERENCE AND/OR FREQUENCY ADJUSTMENT
508
EXCEED LIMIT?
NO, CLOCK BEHIND
NO, CLOCK AHEAD
YES
512
INCREASE FREQUENCY (FIRST TO HIGHER VALUE)
510
ADJUST VALUE OF HARDWARE CLOCK
514
DECREASE FREQUENCY (FIRST TO LOWER VALUE)
516
PROVIDE FREQUENCY ADJUSTMENT TO FIRMWARE OR HARDWARE CONTROLLER
518
GENERATE DIGITAL CONTROL COMMAND(S) (WHILE LIMITING FREQUENCY ADJUSTMENT)
520
PROVIDE DIGITAL CONTROL COMMAND(S) TO DCO
522
RECEIVE DIGITAL CONTROL COMMAND(S)
524
ADJUST LOCAL CLOCK FREQUENCY(S)

64
600
HOST DEVICE
PROCESSOR
22
68
CLOCK SYNC. CIRCUITRY
CLOCK SYNCHRONIZATION SOFTWARE
66
NETWORK ADAPTER BOARD
32
18
DCO
DIGITAL CC
78
16
30
FIRMWARE/ HARDWARE CONTROLLER
46
LOCAL CLOCK
NETWORK ADAPTER CHIP
PTP
20
70
74
46
CORE PLL
PACKET PROCESSING CIRCUITRY
72
LOCAL CLOCK
HARD WARE CLOCK
PACKET TIMESTAMPER
26
24
NETWORK INTERFACE
SERDES PLL
PORTS
36
PPS IN
34
48
38
PTP
76
12,14
74
40
DEVICE
GNSS

NETWORK ADAPTER BOARD
18
DCO
DIGITAL CC
16
32
78
22
30
FIRMWARE/ HARDWARE CONTROLLER
CLOCK SYNC. CIRCUITRY
46
LOCAL CLOCK
NETWORK ADAPTER CHIP
PTP
74
70
20
CORE PLL
46
LOCAL CLOCK
PACKET PROCESSING CIRCUITRY
72
HARD WARE CLOCK
PACKET TIMESTAMPER
26
24
NETWORK INTERFACE
SERDES PLL
PORTS
36
PPS IN
34
48
12,14
38
PTP
76
74
40
DEVICE
GNSS 64
800
HOST DEVICE
PROCESSOR
68
CLOCK SYNCHRONIZATION SOFTWARE
66
22
CLOCK SYNC. CIRCUITRY
80
FREQ. ADJ.
NETWORK ADAPTER BOARD
18
DCO
DIGITAL CC
32
16
78
30
FIRMWARE/ HARDWARE CONTROLLER
46
LOCAL CLOCK
NETWORK ADAPTER CHIP
20
70
46
LOCAL CLOCK
CORE PLL
PACKET PROCESSING CIRCUITRY
72
HARD WARE CLOCK
PACKET TIMESTAMPER
24
26
NETWORK INTERFACE
SERDES PLL
PORTS
36
PPS IN
34
48
12,14
38
76
40
DEVICE
GNSS

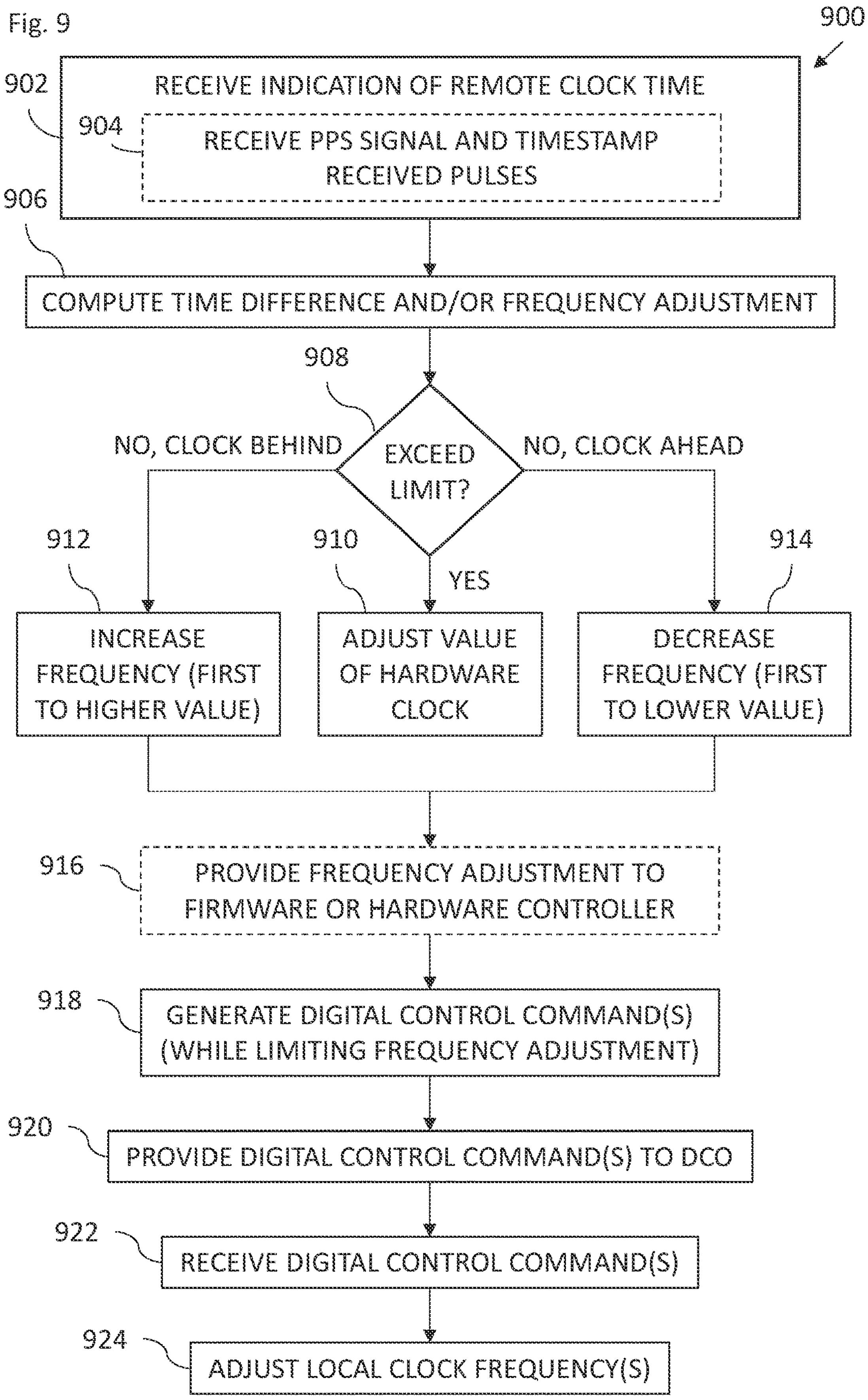

Fig. 9
900
902
RECEIVE INDICATION OF REMOTE CLOCK TIME
904
RECEIVE PPS SIGNAL AND TIMESTAMP RECEIVED PULSES
906
COMPUTE TIME DIFFERENCE AND/OR FREQUENCY ADJUSTMENT
908
EXCEED LIMIT?
NO, CLOCK BEHIND
NO, CLOCK AHEAD
YES
912
INCREASE FREQUENCY (FIRST TO HIGHER VALUE)
910
ADJUST VALUE OF HARDWARE CLOCK
914
DECREASE FREQUENCY (FIRST TO LOWER VALUE)
916
PROVIDE FREQUENCY ADJUSTMENT TO FIRMWARE OR HARDWARE CONTROLLER
918
GENERATE DIGITAL CONTROL COMMAND(S) (WHILE LIMITING FREQUENCY ADJUSTMENT)
920
PROVIDE DIGITAL CONTROL COMMAND(S) TO DCO
922
RECEIVE DIGITAL CONTROL COMMAND(S)
924
ADJUST LOCAL CLOCK FREQUENCY(S)

CLOCK SYNCHRONIZATION USING DIGITALLY CONTROLLED OSCILLATOR

RELATED APPLICATION INFORMATION

The present application is a Continuation-in-Part of U.S. patent application Ser. No. 18/448,936 of Manevich, et al., filed 13-8-2023, the disclosure of which is hereby incorporated herein by reference.

FIELD OF THE INVENTION

The present invention relates to computer systems, and in particular, but not exclusively to, clock synchronization.

BACKGROUND

Clock synchronization among network devices is used in many network applications. One application of using a synchronized clock value is for measuring one-way latency from one device to another device. If the clocks are not synchronized the resulting one-way latency measurement will be inaccurate. Synchronization is typically achieved by syntonization, in which the clock frequency of two devices is aligned, and aligning the phase between the two devices.

For Ethernet, there are two complementary methods to achieve synchronization. One is Synchronous Ethernet (SyncE), which is a physical-layer protocol which achieves syntonization based on the receive/transmit symbol rate. SyncE is an International Telecommunication Union Telecommunication (ITU-T) Standardization Sector standard for computer networking that facilitates the transference of clock signals over the Ethernet physical layer. In particular, SyncE enables clock syntonization inside a network with respect to a master clock.

The other is Precision Time Protocol (PTP), which is a packet-based protocol that may be used with SyncE to align offset (e.g., in Coordinated Universal Time (UTC) format) and phase between two clocks. It should be noted that PTP may be used alone over Ethernet (without SyncE), but this is typically used for lower accuracy use cases. PTP is used to synchronize clocks throughout a computer network, and is considered to be the de facto standard for this purpose.

Time, clock, and frequency synchronization are crucial in some modern computer network applications. They enable 5G and 6G networks, and are proven to enhance the performance of data center workloads.

SUMMARY

There is provided in accordance with an embodiment of the present disclosure, a system, including a digitally controlled oscillator (DCO) to generate a local clock signal having a local clock frequency, and a hardware clock to maintain a value indicative of a local clock time advancing at a frequency proportional to the local clock frequency of the local clock signal generated by the DCO, and clock synchronization circuitry to receive from a device an indication of a remote clock time, generate a digital control command to at least partially correct for a difference between the remote clock time and the local clock time, and provide the digital control command to the DCO, wherein the DCO is to adjust the local clock frequency responsively to the digital control command.

Further in accordance with an embodiment of the present disclosure digital control command indicates a new clock frequency to which to change the local clock frequency by the DCO.

Still further in accordance with an embodiment of the present disclosure digital control command indicates a frequency adjustment to be made by the DCO to the local clock frequency.

Additionally in accordance with an embodiment of the present disclosure digital control command includes an I2C protocol command.

Moreover, in accordance with an embodiment of the present disclosure in response to the local clock time being less than the remote clock time, the clock synchronization circuitry is to generate a first digital control command to increase the clock frequency from X to Y, and a second digital control command to decrease the clock frequency to Z, which is greater than X.

Further in accordance with an embodiment of the present disclosure in response to the local clock time being greater than the remote clock time, the clock synchronization circuitry is to generate a first digital control command to decrease the clock frequency from X to P, and a second digital control command to increase the clock frequency to Q, which is less than X.

Still further in accordance with an embodiment of the present disclosure the clock synchronization circuitry is to generate the digital control command to at least partially correct for a difference between the remote clock time and the local clock time while limiting an adjustment to the local clock frequency by the DCO.

Additionally in accordance with an embodiment of the present disclosure the clock synchronization circuitry is to adjust the value of the hardware clock and/or adjust at least one parameter used to compute the local clock time from the value of the hardware clock responsively to the difference between the remote clock time and the local clock time resulting in a limit being exceeded.

Moreover, in accordance with an embodiment of the present disclosure the clock synchronization circuitry is to exchange time synchronization packets with the device over a network, and generate the digital control command to at least partially correct for the difference between the remote clock time and the local clock time, based on the time synchronization packets.

Further in accordance with an embodiment of the present disclosure, the system includes a pulse per second (PPS) input port to receive a PPS signal from the device, and generate a timestamp from the hardware clock responsively to receiving a pulse of the PPS signal, wherein the clock synchronization circuitry is to generate the digital control command to at least partially correct for the difference between the remote clock time and the local clock time, based on the timestamp.

Still further in accordance with an embodiment of the present disclosure the device is a Global Navigation Satellite System (GNSS).

Additionally in accordance with an embodiment of the present disclosure, the system includes a network device including the DCO, and a network interface controller (NIC) application-specific integrated circuit (ASIC).

Moreover, in accordance with an embodiment of the present disclosure, the system includes a host device to connect to the network device, wherein the host device includes at least part of the clock synchronization circuitry to execute software to receive from the device the indication of the remote clock time, and generate the digital control command to at least partially correct for the difference between the remote clock time and the local clock time.

Further in accordance with an embodiment of the present disclosure, the system includes a host device to connect to the network device, wherein the host device includes a first part of the clock synchronization circuitry to execute software to receive from the device the indication of the remote clock time, and the NIC ASIC includes a second part of the clock synchronization circuitry to execute firmware to generate the digital control command to at least partially correct for the difference between the remote clock time and the local clock time.

Still further in accordance with an embodiment of the present disclosure the NIC ASIC includes the clock synchronization circuitry to execute firmware to receive from the device the indication of the remote clock time, and generate the digital control command to at least partially correct for the difference between the remote clock time and the local clock time.

Additionally in accordance with an embodiment of the present disclosure the NIC ASIC includes the clock synchronization circuitry to receive from the device the indication of the remote clock time, and generate the digital control command to at least partially correct for the difference between the remote clock time and the local clock time.

Moreover, in accordance with an embodiment of the present disclosure the NIC ASIC includes ports to send packets over a network, wherein DCO is connected to the ports and is to output the local clock signal towards the ports to provide a clock source for the ports.

Further in accordance with an embodiment of the present disclosure the DCO is a unitary device to receive the digital control command, and output the local clock signal with the local clock frequency in response to the digital control command.

Still further in accordance with an embodiment of the present disclosure the DCO is to output the local clock signal with the local clock frequency without receiving an input signal from an oscillator, which is external to the DCO.

Additionally in accordance with an embodiment of the present disclosure the DCO is a temperature compensated crystal oscillator (TCXO).

Moreover, in accordance with an embodiment of the present disclosure the DCO is an oven-controlled crystal oscillator (OCXO).

There is also provided in accordance with another embodiment of the present disclosure, a system, including a digitally controlled oscillator (DCO) to generate a local clock having a local clock frequency, a hardware clock to maintain a time-of-day value advancing at a frequency proportional to the local clock frequency of the local clock output by the DCO, and clock synchronization circuitry to synchronize the hardware clock to a remote device, generate a digital control command, and provide the digital control command to the DCO, wherein the DCO is to adjust the local clock frequency responsively to the digital control command.

There is also provided in accordance with still another embodiment of the present disclosure, a method, including generating, by a digitally controlled oscillator (DCO), a local clock signal having a local clock frequency, maintaining a value indicative of a local clock time advancing at a frequency proportional to the local clock frequency of the local clock signal generated by the DCO, receiving from a device an indication of a remote clock time, generating a digital control command to at least partially correct for a difference between the remote clock time and the local clock time, providing the digital control command to the DCO, and adjusting, by the DCO, the local clock frequency responsively to the digital control command.

BRIEF DESCRIPTION OF THE DRAWINGS

The present invention will be understood from the following detailed description, taken in conjunction with the drawings in which:

FIG. 2 is a flowchart including steps in a method of operation of the system of FIG. 1 including synchronization to a remote clock frequency received over a network or other high speed communication link;

FIG. 3 is a flowchart including steps in a method of operation of the system of FIG. 1 including synchronization to a remote clock frequency received from a chained device;

FIG. 5 is a flowchart including steps in a method of operation of the system of FIG. 4;

FIG. 9 is a flowchart including steps in a method of operation of the system of FIG. 8.

DESCRIPTION OF EXAMPLE EMBODIMENTS

Overview

Figure 1:
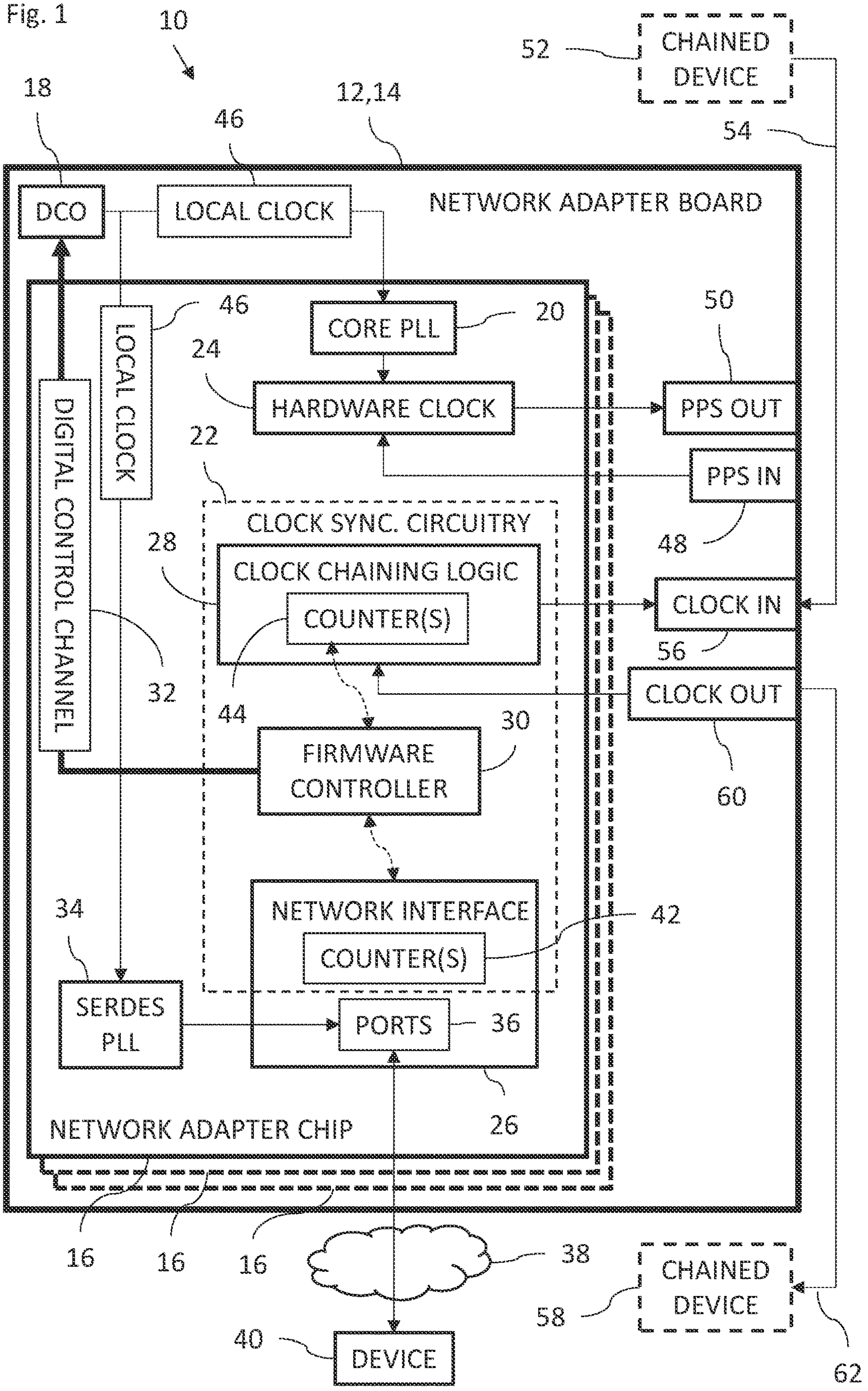
FIG. 1 is a block diagram view of a clock synchronization system constructed and operative in accordance with an embodiment of the present invention.

A local device may transmit data including symbols to a remote device at a rate equal to, or proportional to, its local clock frequency. The local device may also receive data including symbols from the remote device at a rate equal to, or proportional to, the clock frequency of the remote device. Therefore, if the remote device is a master clock for the local device, then the local device may syntonize to the master clock by determining if its local clock is faster or slower than the master clock based on a difference between its send symbol rate and receive symbol rate from the remote device and adjust the frequency of its local clock accordingly.

In some cases, the local device may synchronize its clock time (e.g., time of day value) to the master clock of the remote device using a suitable clock synchronization method such as PTP.

There are many challenges to overcome when designing a local clock which needs to be syntonized or synchronized with a master clock. Some clocks may have low phase noise but have poor drift stability over time. Other clocks, such as temperature or oven compensated clocks may have good drift stability but suffer from phase noise issues.

Embodiments of the present invention address at least some of the above challenges by providing a local clock with low phase noise and good drift stability using a digitally controlled oscillator (DCO) which is controlled by a digital control command. The DCO may include a temperature or oven compensated oscillator to generate an output frequency of around 156.25 Mega Hertz (MHz). Clock synchronization circuitry tracks the difference between the clock time (or frequency) of the local clock and the clock time (or frequency) of a remote master clock (e.g., of a remote device) and instructs the DCO, using a digital control command, to increase or decrease the rate of the local clock based on the tracked difference to correct the clock time and/or frequency of the local clock. The local clock may be adjusted (iteratively) until the local clock is synchronized with the remote master clock.

The synchronization of clock time is now discussed briefly.

In some embodiments, if the clock synchronization circuitry determines that the local clock time is behind the remote clock time, the clock synchronization circuitry sends a digital control command to the DCO to speed up the clock frequency from X to Y for a period of time in order to correct the clock time of the local clock and then reduces the clock frequency from Y to Z (which is still higher than the original clock frequency X) in order for the local clock to continue to follow the time of the remote clock. The adjustments may be made in small increments to ensure that the change in clock frequency does not exceed a limit, for example, 50-100 parts per million (ppm). On the other hand, if the clock synchronization circuitry determines that the local clock time is ahead of the remote clock time, the clock synchronization circuitry sends a digital control command to the DCO to slow down the clock frequency from X to P for a period of time in order to correct the clock time of the local clock and then increase the clock frequency from P to Q (which is still lower that the original clock frequency X) in order for the local clock to continue to follow the time of the remote clock. The adjustments may be made in small increments to ensure that the change in clock frequency does not exceed a limit, for example, 50-100 ppm).

If the difference between the local clock time and the remote clock time is within a given limit, the local clock time may be adjusted by adjusting the frequency of the clock alone. If the difference between the local clock time and the remote clock time is above the given limit, the local clock time may be at least partially adjusted by adjusting the local hardware clock directly, for example, by adjusting a counter value of the local hardware clock and/or by adjusting clock parameters used to determine the local clock time from the counter value maintained by the local hardware clock.

In some embodiments, software running on a host device shares clock synchronization packets (e.g., PPT packets) with the remote device and computes the difference between a local clock time (e.g., of the local clock running on a peripheral device, such as a network device, of the host device) and a remote clock time of the remote clock running on the remote device. The software generates one or more digital control commands to adjust the frequency of clock signal output by the DCO based on the computed difference and sends the digital control command(s) to the DCO.

In some embodiments, firmware running on the peripheral device, e.g., on a firmware processor in a network interface controller (NIC) ASIC of the network device, or a hardware processor on the peripheral device, e.g., which is part of the NIC ASIC, shares clock synchronization packets (e.g., PPT packets) with the remote device and computes the difference between the local clock time and the remote clock time. The firmware or hardware processor generates one or more digital control commands to adjust the frequency of clock signal output by the DCO based on the computed difference and sends the digital control command(s) to the DCO.

In some embodiments, software running on the host device may share clock synchronization packets with the remote device, compute the difference between the local clock time and the remote clock time, and provide the difference to firmware running on the firmware processor or to the hardware processor to generate the digital control command for sending to the DCO. In some cases, the firmware or hardware processor may limit the frequency adjustment to be applied by the DCO to a given limit, such as 50-100 ppm.

In some embodiments, the peripheral device receives a pulse per second (PPS) signal from the remote device, e.g., a global navigation satellite system (GNSS) indicating time of a master clock run by the GNSS. The pulses from the received PPS signal are timestamped by the peripheral device, and the difference between the local clock time and the remote clock time is computed by the software, firmware, hardware processor, based on the timestamps, and one or more digital control commands are generated and provided to the DCO to adjust the frequency of the local clock as described above.

In some embodiments, the remote master clock may be received from a link partner over a network. In some embodiments, clock synchronization is implemented with a network device including a network interface controller (NIC) application specific integrated circuit (ASIC). The ASIC includes ports, clock synchronization circuitry including a firmware controller, and a hardware clock. The ASIC is mounted on a printed circuit board (PCB), which also includes the DCO. The firmware controller provides digital control commands to the DCO via a digital control channel connecting the ASIC with the DCO. The DCO then provides the local clock to the ports and the hardware clock on the ASIC via another connection from the DCO to the ASIC. In some embodiments, the firmware controller may be included in an integrated circuit, which is external to the NIC ASIC.

The syntonization of clock frequency is now discussed briefly.

In some embodiments, firmware running on the firmware controller may read counter value(s) (e.g., counting symbols sent and symbols received) in order to determine whether the local clock is running faster or slower than the remote master clock. The firmware then generates the digital control command, which is then provided to the DCO.

In some cases, the identity of the master clock may not be known and only becomes known after time. Therefore, the receive symbol rates of all the ports may be tracked by the clock synchronization circuitry (e.g., using multiple counters) and when the identity of the master clock is known the firmware determines whether the local clock is faster or slower than the remote master clock (e.g., based on using the value of the relevant counter of the relevant port receiving the remote master clock).

In some embodiments, the network device may include multiple NIC ASICs, with each ASIC including ports and clock synchronization circuitry. The ASICs are mounted on a PCB with the DCO and firmware controller. The firmware controller identifies the port receiving the remote master clock from among the ports on the different ASICs and determines whether the local clock is faster or slower than the remote master clock and generates a digital control command and provides the digital control command to the DCO to adjust the frequency of the local clock. The local clock is provided to the ports on each of the ASICs and to the hardware clocks on each of the ASICs.

In some embodiments, the remote master clock may be received from a device connected via a clock connection, e.g., a clock cable or a printed circuit board (PCB) trace. Similarly, a clock synchronization signal based on the local clock may be generated and provided to another device connected to the local device via another clock connection, e.g., a clock cable or a PCB trace.

System Description

Reference is now made to FIG. 1, which is a block diagram view of a clock synchronization system 10 constructed and operative in accordance with an embodiment of the present invention.

The clock synchronization system 10 includes a device 12. In the example of FIG. 1, the device 12 is a network device including a network adapter board 14 (e.g., PCB) and one or more network adapter chips 16, e.g., NIC ASICS mounted on the network adapter board 14. The device 12 may be implemented as any suitable processing device, for example, a device including a CPU and/or a GPU.

The device 12 includes a digitally controller oscillator (DCO) 18 mounted on the network adapter board 14. The DCO 18 is configured to generate a local clock 46 having a local clock frequency. SiT5377 is a ±100 ppb precision MEMS Super-TCXO and is suitable for use as DTO 18. SiT5377 is commercially available from SiTime Corporation, 5451 Patrick Henry Drive, Santa Clara, CA 95054, USA.

The network adapter board 14 (or each network adapter board 14) may include any one or more of the following: a core phase-locked loop (PLL) 20, clock synchronization circuitry 22, a hardware clock 24, a network interface 26, clock chaining logic 28, a firmware controller 30, a digital control channel 32, and a serializer/deserializer (SerDes) PLL 34. The network interface 26 may include one or more ports 36 to receive and/or transmit packets over a network 38 from/to one or more remote devices 40 (only one shown for the sake of simplicity). The network interface 26 may also include one or more counters 42 in which to count symbols sent and received by the ports 36 described in more detail with reference to FIG. 2. The clock chaining logic 28 may also include one or more counters 44 described in more detail with reference to FIG. 3.

The DCO 18 is connected to the hardware clock 24 via the core PLL 20. The DCO 18 is configured to output a local clock 46 towards the hardware clock 24. The hardware clock 24 is configured to maintain a time-of-day value advancing at a frequency proportional to the local clock frequency of the local clock 46 output by the DCO 18. The core PLL 20 is configured to proportionally change the local clock 46 provided by the DCO 18 to a frequency (e.g., to a higher frequency by multiplying the local clock by a given value) used by the hardware clock 24. The time-of-day value of the hardware clock 24 may be used to provide time values for timestamping performed by the network interface 26.

The time-of-day of the hardware clock 24 may be synchronized to a remote master time-of-day or using any suitable method, for example, PTP. In some cases, the hardware clock 24 may be a master clock for time-of-day for another device. The device 12 may include a pulse per second (PPS) input port 48 and a PPS output port 50 for receiving and sending time-of-day synchronization data, respectively.

The DCO 18 is connected to the network interface 26 via the SerDes PLL 34. The DCO 18 is configured to output the local clock 46 towards the network interface 26. The SerDes PLL 34 is configured to proportionally change the local clock 46 provided by the DCO 18 to a frequency (e.g., to a higher frequency by multiplying the local clock by a given value) used by the network interface 26. The ports 36 of the network interface 26 are configured to send packets over the network 38 at a symbol rate based on a frequency proportional to the local clock frequency.

In some embodiments, the network interface 26 is configured to count symbols received by one or more of the ports 36 and count symbols sent by one or more of the ports 36. Separate counters 42 may be maintained for sent and received symbols per port 36 or a combined counter may be maintained for both sent and received symbols per port 36 so that a difference between symbols sent and received in a time window is tracked by a counter per port 36, for example, by incrementing a counter for received symbols and decrementing that counter for sent symbols, or vice-versa.

The clock synchronization circuitry 22 may be implemented to include the clock chaining logic 28, the firmware controller 30, and the counters 42 of the network interface 26. The values of the counter(s) 42 and/or the counter(s) 44 are exposed to the firmware controller 30 to enable the firmware controller 30 to determine whether the local clock provided by the DCO 18 is faster or slower than a remote master clock, as described in more detail with reference to FIGS. 2 and 3. The firmware running on the firmware controller 30 is configured to generate digital control commands to control the DCO 18 and provide the digital control commands to the DCO 18 via the digital control channel 32. In some embodiments, the firmware controller 30 may be disposed on the network adapter board 14 externally to the network adapter chip(s) 16. In some embodiments, the functionality of the firmware controller 30 may be at least partially implemented using a hardware processor, and/or processor such as a CPU running suitable software in the device 12 or in a peripheral or host device.

In some situations, the remote master clock may be received from one of the remote devices 40 over the network 38. The symbol rate of the data received from that remote device 40 is counted by the network interface 26 using the counters 42. Controlling the DCO 18 based on the remote master clock being received from the remote device 40 is described in more detail with reference to FIG. 2.

In some embodiments, the device 12 may include a peripheral device communication data bus interface (e.g., PCIe interface) (not shown) in addition to, or instead of the network interface 26. The communication data bus interface may be configured to count symbols sent and received over a high-speed link disposed between the device 12 and one of the remote devices 40. The clock synchronization circuitry 22 may be configured to synchronize the local clock 46 generated by the DCO 18 to a remote master clock received from one of the remote devices 40 via the communication data bus interface.

The device 12 may also include a clock input port 56. In some situations, the clock chaining logic 28 may be configured to receive the remote master clock as a clock synchronization signal from a chained device 52 via a clock connection 54 (e.g., a clock cable or PCB trace) connected to the clock input port 56. The DCO 18 may also be connected to the clock chaining logic 28 and be configured to provide the local clock 46 to the clock chaining logic 28. Features (e.g., pulses of the signals or other identifiable sections of the signal waveform such as rising edges of the waveform) of the clock synchronization signal and local clock 46 are counted by the clock chaining logic 28 using the counters 44. As the local clock 46 and the clock synchronization signal may be at different base frequencies, for example, the local clock 46 may be around 156.25 MHz whereas the clock synchronization signal may be around 10

MHz, either the counting method of the features of the local clock 46 and the clock synchronization signal need to be adjusted, and/or the computation of the frequency difference needs to take into account the difference between the base frequencies, or some other method may be employed to equate the differences in the base frequencies. The device 12 may also include a clock output port 60. The clock chaining logic 28 may multiply or divide the local clock 46 by a given factor to yield a clock synchronization signal for output to another chained device 58 via a clock connection 62 (e.g., a clock cable or PCB trace) connected to the clock output port 60. FIG. 1 shows the chained device 52 and the chained device 58 disposed externally to the device 12. In some embodiments, the chained device 52 and/or the chained device 58 may be disposed on the (network adapter) board 14. Adjusting the DCO 18 based on the remote master clock being received from the chained device 52 is described in more detail with reference to FIG. 3.

When the device 12 includes multiple network adapter chips 16, the network interface 26 and the clock synchronization circuitry 22 may be distributed among the multiple chips 16.

Reference is now made to FIG. 2, which is a flowchart 200 including steps in a method of operation of the system 10 of FIG. 1 including synchronization to a remote clock frequency received over the network 38 or other high speed communication link. Reference is also made to FIG. 1.

One of the ports 36 (designated as receiving the master clock) of the network interface 26 is configured to receive a signal including data (e.g., first packets) from the device 40 over the network 38 and transmit a signal including data (e.g., second packets) over the network 38 (block 202).

The clock synchronization circuitry 22 is configured to receive the signal from the device 40, the signal being indicative of a remote clock frequency (block 204). In some embodiments, the part of the network interface 26 included in the clock synchronization circuitry 22 is configured to receive from the device 40 the signal indicative of the remote clock frequency (block 204). The data rate, e.g., symbol rate, of the received signal is typically indicative of the remote clock frequency. The remote clock frequency is the frequency of a remote clock which is remote to the local clock 46 generated by the DCO 18. The remote clock may be external to the clock synchronization system 10. The remote clock may be internal to the clock synchronization system 10 but not generated by the DCO 18. For example, the network adapter board 14 may include another DCO which generates the remote clock for example. This latter example may be more relevant to the embodiment of FIG. 3 where the source of the remote clock is from the chained device 52 which may be external to the clock synchronization system 10 or disposed on the network adapter board 14.

In some embodiments, the part of the network interface 26 included in the clock synchronization circuitry 22 is configured to count symbols of the received signal and the transmitted signal in a time window using the counter(s) 42 (block 206). The firmware controller 30 may be configured to send a command to the network interface 26 to initiate counting of the symbols. The symbols of the received signal may be counted on one of the counters 42 and the symbols of the transmitted signal may be counted on another one of the counters 42. In some embodiments, the symbols of the received signal and the transmitted signal may be counted on the same counter 42 such that the counter 42 is incremented for every received symbol and decremented for every transmitted symbol, or vice-versa.

The clock synchronization circuitry 22 is configured to compare measures of the remote clock frequency and the local clock frequency (block 208). In some embodiments, the firmware controller 30 of the clock synchronization circuitry 22 is configured to run firmware to compute the comparison of the remote clock frequency and the local clock frequency.

In some embodiments, the clock synchronization circuitry 22 is configured to compare the symbol rate of the received signal to a symbol rate of the transmitted signal to provide the comparison of the remote clock frequency and the local clock frequency (block 210). In some embodiments, the firmware controller 30 of the clock synchronization circuitry 22 is configured to run the firmware to compute the comparison of the remote clock frequency and the local clock frequency based on the symbol count of the counter(s) 42 (block 212). For example, the comparison may be equal to the difference between the symbol count of received symbols and symbol count of the transmitted symbols in the time window.

The firmware controller 30 of the clock synchronization circuitry 22 is configured to run the firmware to generate a digital control command based on the comparison (block 214). For example, if the symbol count of received symbols is greater than symbol count of the transmitted symbols in the time window, then the remote clock is faster than the local clock and therefore the speed of the local clock should be increased, and vice-versa. The adjustment to the speed of the local clock may be proportional to the difference between the symbol count of received symbols and symbol count of the transmitted symbols in the time window.

In some embodiments, the digital control command indicates a new clock frequency to which to change the local clock frequency by the DCO 18. For example, the digital control command may take the following form: "set your frequency to your initial frequency multiplied by X/Y", where X and Y could be any suitable values such as 100 million plus 1 and 100 million, or 100 billion plus 1 and 100 billion. The interface may also be a single number, which multiplies the initial frequency, such as 1.00000001.

In some embodiments, the digital control command indicates a frequency adjustment to be made by the DCO 18 to the local clock frequency. For example, if the current frequency of the local clock 46 is 156.25 MHz and the local clock 46 is slow by 1 Hz, the digital control command may indicate that the new clock frequency should be increased by 1 Hz.

The firmware controller 30 is configured to provide the digital control command to the DCO 18 via the digital control channel 32 (block 216). The DCO 18 is configured to adjust the local clock frequency responsively to the digital control command received from the firmware controller 30 (block 218). The DCO 18 is configured to output the local clock 46 towards the hardware clock 24 and the network interface 26 via the core PLL 20 and the SerDes PLL 34, respectively (block 220).

Reference is now made to FIG. 3, which is a flowchart 300 including steps in a method of operation of the system 10 of FIG. 1 including synchronization to a remote clock frequency received from the chained device 52. Reference is also made to FIG. 1.

The clock input port 56 is configured to receive a first clock synchronization signal via clock connection 54 from chained device 52 (block 302). The clock chaining logic 28 is configured to receive the first clock synchronization signal from the clock input port 56 (block 304). The first clock synchronization signal is indicative of the remote clock frequency of the clock running on the chained device 52. The first clock synchronization signal is generally an analogue signal having a frequency proportional to the frequency of the clock running on the chained device 52. For example, the clock running on the chained device 52 may have a frequency around 156.25 MHz, while the clock synchronization signal has a frequency around 10 MHz. The remote clock frequency is the frequency of a remote clock which is remote to local clock generated by the DCO 18. The remote clock may be external to the clock synchronization system 10. The remote clock may be internal to the clock synchronization system 10 but not generated by the DCO 18. For example, the network adapter board 14 may include chained device 52 which includes another DCO which generates the remote clock.

In some embodiments, the clock chaining logic 28 is configured to count features of the received first clock synchronization signal and the local clock 46 in a time window using the counter(s) 44 (block 306). The features may include pulses of the signals or other identifiable sections of the signal waveform, e.g., rising edges of the waveform. The firmware controller 30 may be configured to send a command to the clock chaining logic 28 to initiate counting of the features. The features of the received first clock synchronization signal may be counted on one of the counters 44 and the features of the local clock 46 may be counted on another one of the counters 44. In some embodiments, the features of the first clock synchronization signal and the local clock 46 may be counted on the same counter 42 such that the counter 44 is incremented for every feature of the first clock synchronization signal and decremented for every feature of the local clock 46 (assuming the signals have compatible frequencies), or vice-versa.

The clock synchronization circuitry 22 is configured to compare measures of the remote clock frequency and the local clock frequency (block 308). In some embodiments, the firmware controller 30 of the clock synchronization circuitry 22 is configured to run firmware to compute the comparison of the remote clock frequency and the local clock frequency. In some embodiments, the clock synchronization circuitry 22 is configured to compare a number of features of the first clock synchronization signal to a number of features of the local clock 46 to provide the comparison of the remote clock frequency and the local clock frequency (block 310). In some embodiments, the firmware controller 30 of the clock synchronization circuitry 22 is configured to run the firmware to compute the comparison of the remote clock frequency and the local clock frequency based on the count value(s) of the counter(s) 44 (block 312). For example, the comparison may be equal to the difference between the feature count of the first clock synchronization signal and the feature count of the local clock 46 in the time window.

The firmware controller 30 of the clock synchronization circuitry 22 is configured to run the firmware to generate a digital control command based on the comparison (block 314). For example, if the feature count of the first clock synchronization signal is greater than the feature count of the local clock 46 in the time window, then the remote clock (as indicated by the first clock synchronization signal) is faster than the local clock 46 and therefore the speed of the local clock 46 should be increased. The adjustment to the speed of the local clock 46 may be proportional to the difference between the feature count of the first clock synchronization signal and the feature count of the local clock 46 in the time window.

In some embodiments, the digital control command indicates a new clock frequency to which to change the local clock frequency by the DCO 18. For example, the digital control command may take the following form: "set your frequency to your initial frequency multiplied by X/Y", where X and Y could be any suitable values such as 100 million plus 1 and 100 million, or 100 billion plus 1 and 100 billion. The interface may also be a single number, which multiplies the initial frequency, such as 1.00000001.

In some embodiments, the digital control command indicates a frequency adjustment to be made by the DCO 18 to the local clock frequency. For example, if the current frequency of the local clock 46 is 156.25 MHz and the local clock 46 is slow by 1 Hz, the digital control command may indicate that the new clock frequency should be increased by 1 Hz.

The firmware controller 30 is configured to provide the digital control command to the DCO 18 via the digital control channel 32 (block 316). The DCO 18 is configured to adjust the local clock frequency responsively to the digital control command received from the firmware controller 30 (block 318). The DCO 18 is configured to output the local clock 46 towards the hardware clock 24 and the network interface 26 via the core PLL 20 and the SerDes PLL 34, respectively (block 320).

The clock chaining logic 28 may be configured to: proportionally change (e.g., step up or step down but with a constant proportion of the base frequency of the local clock 46) a frequency of the local clock 46 to yield a second clock synchronization signal; and provide the second clock synchronization signal to the clock output port 60 for output to the chained device 58 via the clock connection 62 (clock 322). The clock output port 60 is configured to provide the second clock synchronization signal to the chained device 58 via the clock connection 62.

Figure 4:
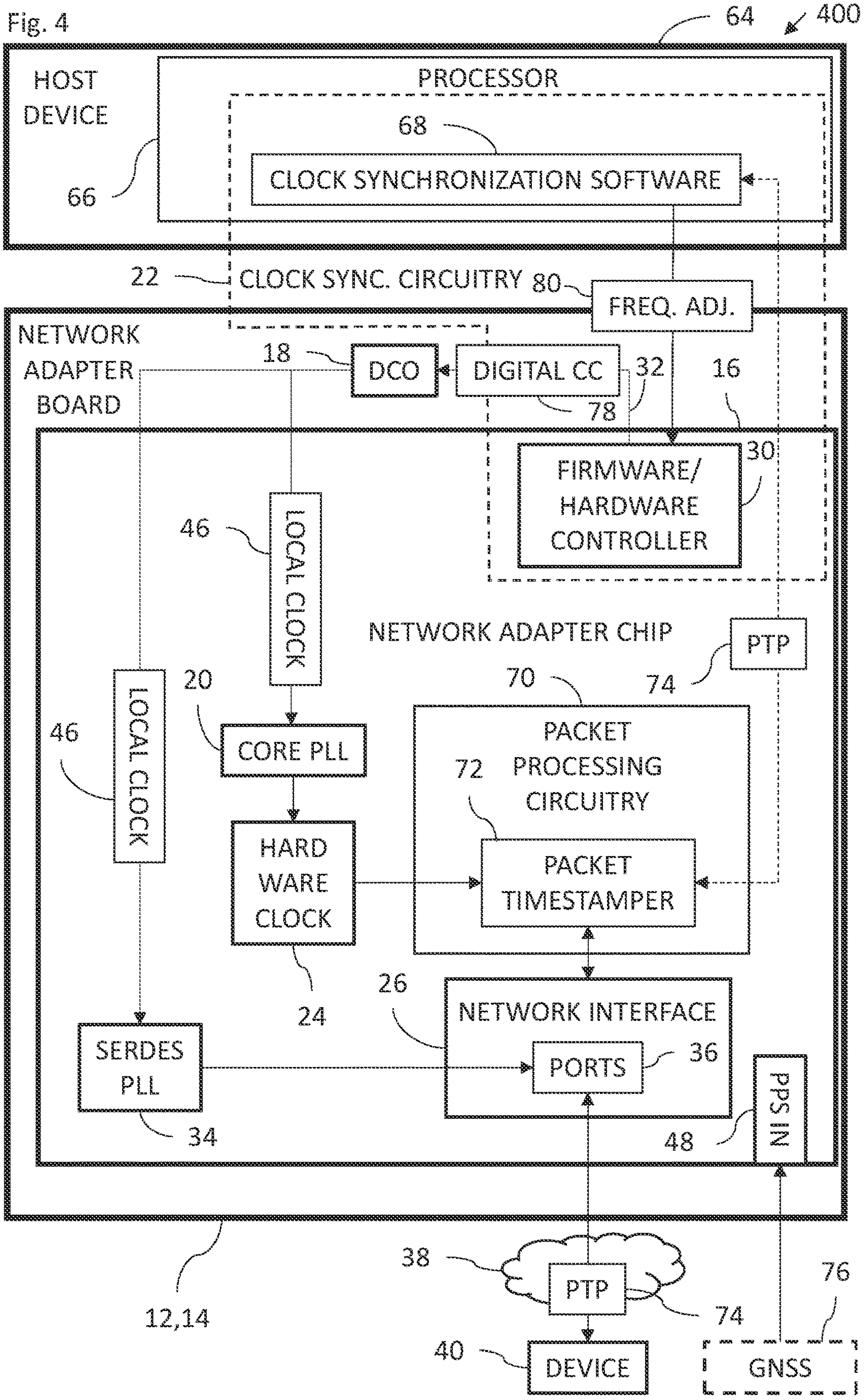
FIG. 4 is a block diagram view of a clock synchronization system constructed and operative in accordance with a first alternative embodiment of the present invention.

Reference is now made to FIG. 4, which is a block diagram view of a clock synchronization system 400 constructed and operative in accordance with a first alternative embodiment of the present invention.

The clock synchronization system 400 includes device 12 and a host device 64. The host device 64 is configured to be connected to the device 12 via a suitable peripheral communication bus operative according to any suitable protocol, such as Peripheral Component Interconnect Express (PCIe). The host device 64 includes a processor 66 configured to execute clock synchronization software 68.

In the example of FIG. 4, device 12 is a network device including network adapter board 14 (e.g., PCB) and one or more network adapter chips 16, e.g., NIC ASICs mounted on the network adapter board 14. The device 12 may be implemented as any suitable processing device, for example, a device including a CPU and/or a GPU.

The device 12 (e.g., network device) includes DCO 18 mounted on the network adapter board 14. The DCO 18 is configured to generate a local clock signal 46 having a local clock frequency. SiT5377 is a ±100 ppb precision MEMS Super-TCXO and is suitable for use as DTO 18. SiT5377 is commercially available from SiTime Corporation.

The network adapter board 14 may include any one or more of the following: core phase-locked loop (PLL) 20, clock synchronization circuitry 22, hardware clock 24, network interface 26, firmware (or hardware) controller 30, digital control channel 32, and serializer/deserializer (SerDes) PLL 34. The network interface 26 may include one or more ports 36 to receive and/or transmit packets (e.g., PTP packets 74) over network 38 from/to remote device(s) 40 (only one shown for the sake of simplicity). The network adapter chip 16 includes packet processing circuitry 70 for processing received packets and packets for sending over network 38. The packet processing circuitry 70 includes a packet time stamper 72.

The DCO 18 is connected to the hardware clock 24 via the core PLL 20. The DCO 18 is configured to output a local clock signal 46 towards the hardware clock 24. The hardware clock 24 is configured to maintain a value indicative of a local clock time (e.g., time-of-day value) advancing at a frequency proportional to the local clock frequency of the local clock signal 46 generated by the DCO 18. In some embodiments, the hardware clock 24 is configured to maintain a counter value from which the time-of-day value may be derived using one or more clock parameters. The core PLL 20 is configured to proportionally change the local clock signal 46 provided by the DCO 18 to a frequency (e.g., to a higher frequency by multiplying the local clock by a given value) used by the hardware clock 24. The time-of-day value may be used to provide time values for timestamping performed by packet times tamper 72.

The time-of-day of the hardware clock 24 may be synchronized to a remote master time-of-day or using any suitable method, for example, PTP, as described in more detail with reference to FIG. 5. In some cases, the hardware clock 24 may be a master clock for time-of-day of another device. The device 12 may include a pulse per second (PPS) input port 48 and a PPS output port (not shown) for receiving and sending time-of-day synchronization data, respectively. The PPS input port 48 may receive time-of-day synchronization data from a remote device, such as a global navigation satellite system (GNSS) 76.

The DCO 18 is connected to the ports 36 of the network interface 26 via the SerDes PLL 34. The DCO 18 is configured to output the local clock signal 46 towards the ports 36 of the network interface 26 to provide a clock source for the ports 36. The SerDes PLL 34 is configured to proportionally change the local clock signal 46 provided by the DCO 18 to a frequency (e.g., to a higher frequency by multiplying the local clock by a given value) used by the network interface 26. In some embodiments, the ports 36 of the network interface 26 are configured to send packets over the network 38 at a symbol rate based on a frequency proportional to the local clock frequency.

The host device 64 may include a first part of the clock synchronization circuitry 22 configured to execute clock synchronization software 68 on the processor 66, with the clock synchronization software 68 being configured to receive an indication of the remote clock time from one of the remote devices 40. The network adapter chip 16 may include a second part of the clock synchronization circuitry 22 to execute firmware on the firmware controller 30 to generate the digital control command(s) 78 to at least partially correct for a difference between the remote clock time and the local clock time. The clock synchronization software 68 is configured to compute one or more frequency adjustments 80 with which to adjust the local clock 46 in order to synchronize the time of day of the hardware clock 24 to the time of day of a remote clock of one of the remote devices 40. Firmware running on the firmware controller 30 is configured to generate one or more digital control commands 78 (based on the frequency adjustment(s) 80) to control the DCO 18 and provide the digital control commands 78 to the DCO 18 via the digital control channel 32. In some embodiments, the firmware controller 30 may be disposed on the network adapter board 14 externally to the network adapter chip 16. In some embodiments, the functionality of the firmware controller 30 may be at least partially implemented using a hardware processor, and/or processor such as a CPU running suitable software in the device 12 or in a peripheral or host device.

When the device 12 includes multiple network adapter chips 16, the network interface 26 and the clock synchronization circuitry 22 may be distributed among the multiple chips 16.

In practice, some, or all of these functions of the clock synchronization circuitry 22 may be combined in a single physical component or, alternatively, implemented using multiple physical components. These physical components may comprise hard-wired or programmable devices, or a combination of the two. In some embodiments, at least some of the functions of the clock synchronization circuitry 22 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

The DCO 18 is generally a unitary device configured to receive the digital control command(s) 78 and output the local clock signal 46 with the local clock frequency in response to the digital control command(s) 78. The DCO 18 is generally configured to output the local clock signal 46 with the local clock frequency without receiving an input signal from an oscillator, which is external to the DCO 18.

In some embodiments, the DCO 18 may be a "high end" digitally controlled oscillator, such as Temperature Compensated Crystel Oscillator (TCXO) or an Oven Controlled Crystal Oscillator (OCXO), or an atomic clock, which may provide an extended "holdover" period, which means that the device 12 may remain synchronized for an extended time after losing its connection to its reference remote clock. For example, by setting the frequency to the average frequency before losing the reference, or using more advanced methods, such as active "open loop" steering for compensating for known factors which contribute to oscillator inaccuracies, such as oscillator aging and temperature variations.

Reference is now made to FIG. 5, which is a flowchart 500 including steps in a method of operation of the system of FIG. 4. Reference is also made to FIG. 4. The clock synchronization software 68 executed by the processor 66 (which is part of the clock synchronization circuitry 22) is configured to receive from device 40 an indication of a remote clock time of a remote clock running on the remote device 40 (block 502). In some embodiments, the clock synchronization software 68 is configured to exchange time synchronization packets 74 (e.g., PTP packets) with the device 40 over network 38 (block 504). The time synchronization packets 74 are received by one of ports 36 of network interface 26 and processed by packet processing circuitry 70 including being timestamped by packet time stamper 72. The processed time synchronization packets 74 are then passed to the clock synchronization software 68.

The clock synchronization software 68 is configured to compute a time difference between the local clock time and the remote clock time and/or a frequency adjustment to be applied to the local clock signal 46 based on comparing the local clock time with the remote clock time, for example, from the timestamped time synchronization packets 74 (block 506). At a decision block 508, the clock synchronization software 68 is configured to check whether the difference between the remote clock time and the local clock time results in, or will result in, a limit being exceeded. The limit being exceeded may be the difference between the local clock time and the remote clock time exceeding a given value. In some embodiments, the limit being exceeded may be the size of the frequency adjustment needed to correct the local clock due to the difference between the local clock time and the remote clock time exceeding a given value.

If the difference between the remote clock time and the local clock time results, or will result, in the limit being exceeded, the clock synchronization software 68 is configured to adjust the value of the hardware clock 24 and/or adjust at least one parameter used to compute the local clock time from the value of the hardware clock 24 (block 510).

If the difference between the remote clock time and the local clock time does not result in the limit being exceeded, the clock synchronization software 68 is configured to determine how to adjust the frequency of the local clock signal 46. In some embodiments, if the local clock time is behind (i.e., less than) the remote clock time, the clock synchronization software 68 (of the clock synchronization circuitry 22) may cause the clock frequency to increase from X to Y in order to first correct the local clock time and then cause the clock frequency to decrease from Y down to Z, which is greater than X to cause the local clock signal 46 to run at the correct frequency in order for the local clock time derived from the hardware clock 24 to continue to follow the remote clock time (block 512). If the local clock time is ahead (i.e., more than) the remote clock time, the clock synchronization software 68 (of the clock synchronization circuitry 22) may cause the clock frequency to decrease from X to P in order to first correct the local clock time and then cause the clock frequency to increase from P up to Q, which is less than X to cause the local clock signal 46 to run at the correct frequency in order for the local clock time derived from the hardware clock 24 to continue to follow the remote clock time (block 514). The clock synchronization software 68 is configured to provide the frequency adjustment(s) to the firmware controller 30 (block 516).

The firmware controller 30 is configured to receive the frequency adjustment(s) from the clock synchronization software 68 and generate one or more digital control commands 78 from the frequency adjustment(s) (block 518). In some embodiments, the firmware executed by the firmware controller 30 of the clock synchronization circuitry 22 is configured to generate the digital control command(s) 78 to at least partially correct for the difference between the remote clock time and the local clock time (based on the received frequency adjustment(s)). In some embodiments, the firmware is configured to generate the digital control command(s) 78 to at least partially correct for the difference between the remote clock time and the local clock time, (based on the received frequency adjustment(s) which are) based on the received time synchronization packets.

In some embodiments, the firmware is configured to generate the digital control command(s) to at least partially correct for a difference between the remote clock time and the local clock time while limiting the adjustment(s) to the local clock frequency of the local clock signal 46 by the DCO 18. For example, the firmware may be configured to reduce the frequency adjustment(s) provided by the clock synchronization software 68 so the adjustment to the frequency is within a given adjustment, for example, 50-100 ppm.

As mentioned previously, the frequency of the local clock signal 46 may be adjusted from X to Y and then to Z (or from X to P and then Q) in order to first correct the local clock time and then cause the clock frequency to run at the correct frequency in order for the local clock time to continue to follow the remote clock time. Therefore, in some embodiments, in response to the local clock time being less than the remote clock time, the firmware is configured to generate: a first digital control command to increase the clock frequency from X to Y; and a second digital control command to decrease the clock frequency to Z, which is greater than X. In response to the local clock time being greater than the remote clock time, the firmware is configured to generate: a first digital control command to decrease the clock frequency from X to P; and a second digital control command to increase the clock frequency to Q, which is less than X.

In some embodiments, each digital control command 78 indicates a new clock frequency to which to change the local clock frequency by the DCO 18. In other embodiments, the digital control command 78 indicates a frequency adjustment to be made by the DCO 18 to the local clock frequency. In some embodiments, the digital control command includes an $I^2C$ protocol command.

The firmware is configured to provide the digital control command(s) 78 to the DCO (via I2C protocol) (block 520). The DCO 18 is configured to receive the digital control command(s) 78 (block 522). The DCO 18 is configured to adjust the local clock frequency responsively to the digital control command(s) 78 (block 524). Therefore, the DCO 18 is configured to output the local clock signal 46 with the local clock frequency in response to the digital control command(s) 78.

Figure 6:
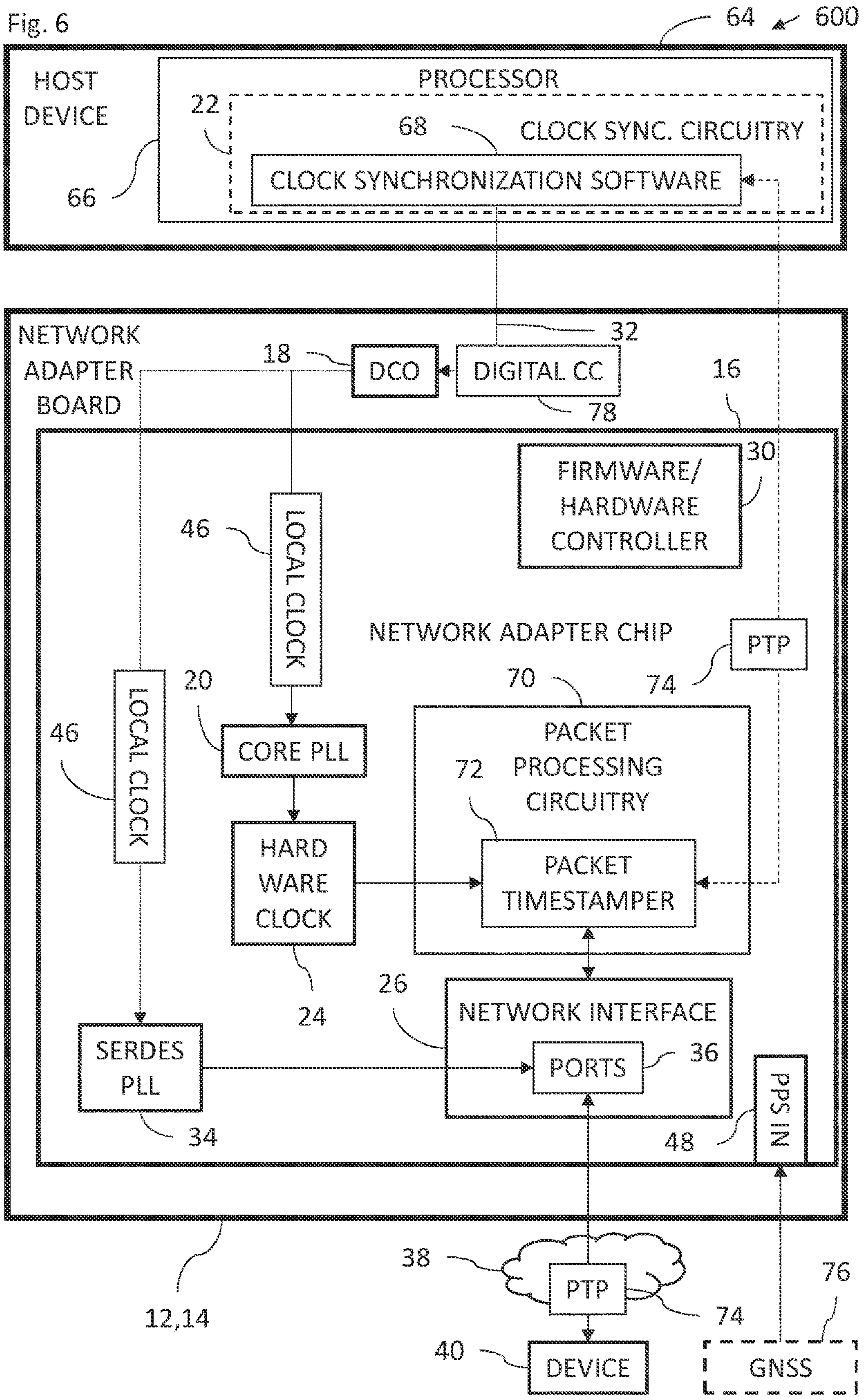
FIG. 6 is a block diagram view of a clock synchronization system constructed and operative in accordance with a second alternative embodiment of the present invention.

Reference is now made to FIG. 6, which is a block diagram view of a clock synchronization system 600 constructed and operative in accordance with a second alternative embodiment of the present invention. Reference is also made to FIG. 5. The clock synchronization system 600 is substantially the same as clock synchronization system 400 except for the following differences. In clock synchronization system 600, the host device 64 includes the clock synchronization circuitry 22 which is included in part of the processor 66 executing the clock synchronization software 68. The clock synchronization software 68 performs steps of blocks 502-520, and the step of block 516 is not needed as the firmware controller 30 does not need to receive the digital control commands 78 in clock synchronization system 600. In particular, the clock synchronization software 68 is configured to receive from the device 40 the indication of the remote clock time (block 502), generate the digital control command(s) 78 to at least partially correct for the difference between the remote clock time and the local clock time (block 518), and provide the digital control command(s) 78 to DCO 18 (block 520).

Figure 7:
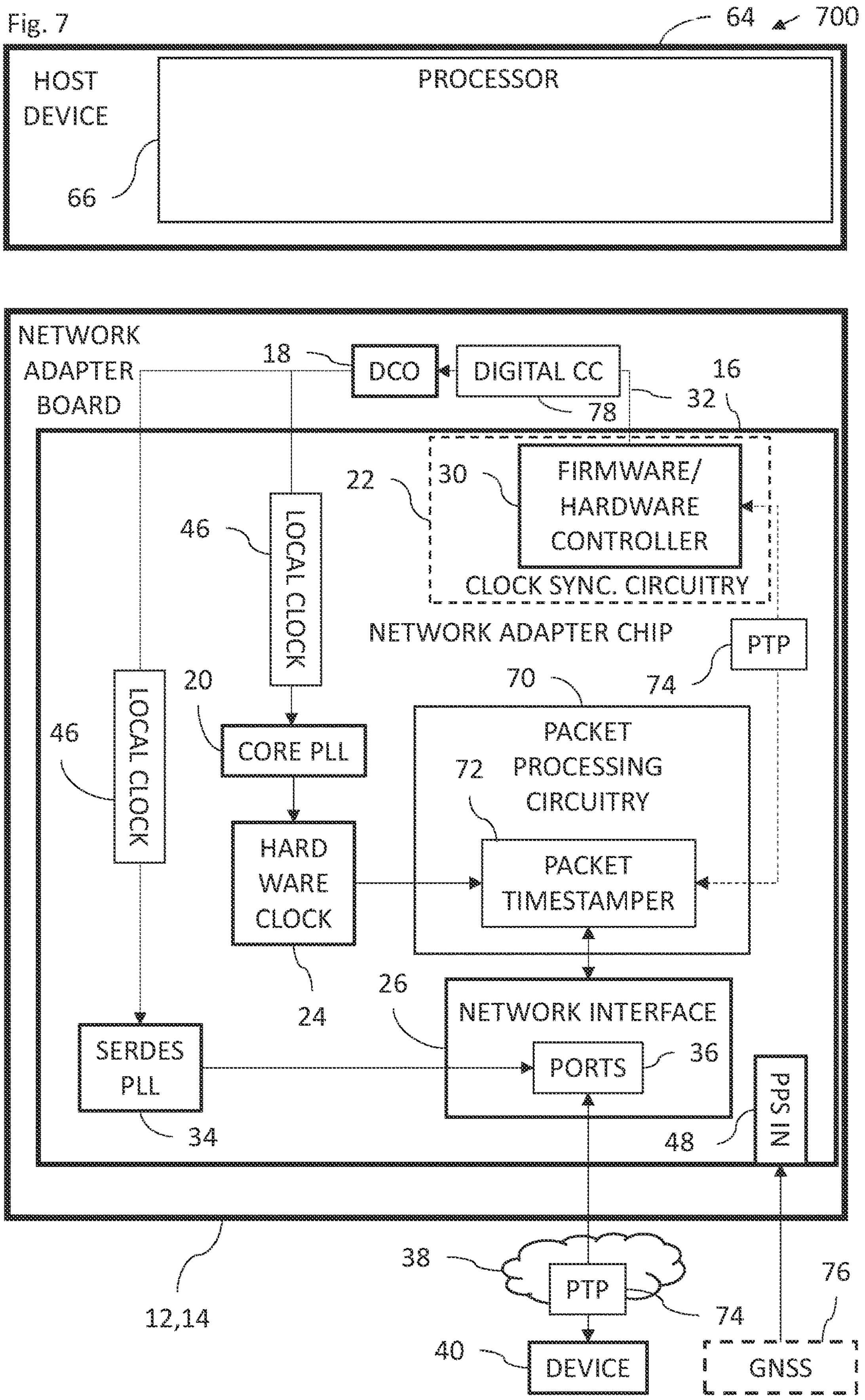
FIG. 7 is a block diagram view of a clock synchronization system constructed and operative in accordance with a third alternative embodiment of the present invention.

Reference is now made to FIG. 7, which is a block diagram view of a clock synchronization system 700 constructed and operative in accordance with a third alternative embodiment of the present invention. Reference is also made to FIG. 5. The clock synchronization system 700 is substantially the same as clock synchronization system 600 except for the following differences. In clock synchronization system 700, the network adapter chip 16 includes the clock synchronization circuitry 22, which includes the firmware controller 30 to execute the firmware. The firmware is configured to perform steps of blocks 502-520, and the step of block 516 is not needed. In particular, the firmware is configured to receive from the device 40 the indication of the remote clock time (block 502), generate the digital control command(s) 78 to at least partially correct for the difference between the remote clock time and the local clock time (block 518), and provide the digital control command(s) 78 to DCO 18 (block 520).

In some embodiments, the firmware controller 30 may be replaced by a hardware processor/controller, which is configured to perform steps of blocks 502-520, and the step of block 516 is not needed. In particular, the hardware processor/controller is configured to receive from the device 40 the indication of the remote clock time (block 502), generate the digital control command(s) 78 to at least partially correct for the difference between the remote clock time and the local clock time (block 518), and provide the digital control command(s) 78 to DCO 18 (block 520).

Figure 8:
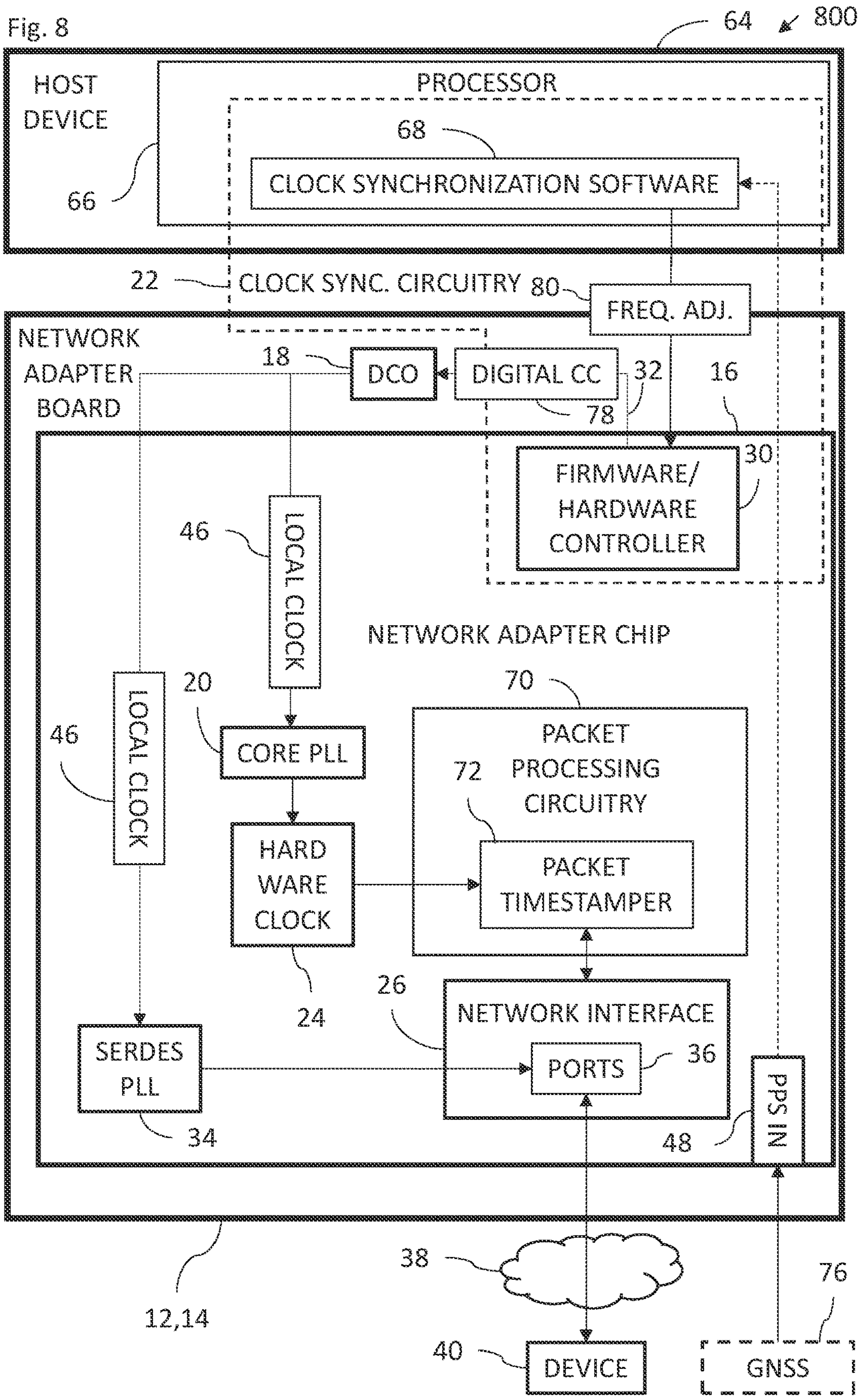
FIG. 8 is a block diagram view of a clock synchronization system constructed and operative in accordance with a fourth alternative embodiment of the present invention.

Reference is now made to FIG. 8 is a block diagram view of a clock synchronization system 800 constructed and operative in accordance with a fourth alternative embodiment of the present invention. Reference is also made to FIG. 9 is to a flowchart 900 including steps in a method of operation of the system 800 of FIG. 8. The clock synchronization system 800 is substantially the same as the clock synchronization system 400 except for the following differences. In particular, in the clock synchronization system 800, clock synchronization is based on a received PPS signal instead of based on exchanging clock synchronization packets 74.

The flowchart 900 is substantially the same as flowchart 500 except for the following differences. In particular, the steps of blocks 902-924 substantially correspond to the steps of blocks 502-524 of FIG. 5, except that the step of block 904 includes: PPS input port 48 being configured to receive a PPS signal from a device such as GNSS 76; and PPS input port 48 being configured to generate a timestamp from the hardware clock 24 responsively to receiving a pulse of the PPS signal. In addition, the clock synchronization software 68 of the clock synchronization circuitry 22 is configured to compute the frequency adjustment(s) 80 to the local clock signal 46 based on the timestamp(s) of the PPS pulses (block 906), and the firmware controller 30 of the clock synchronization circuitry 22 is configured to generate the digital control command(s) 78 to at least partially correct for the difference between the remote clock time and the local clock time, based on the frequency adjustments computed by the clock synchronization software 68 (which are based on the timestamp(s) of the PPS pulse(s)) (block 918).

In some embodiments, the clock synchronization software 68 performs steps of blocks 902-920, and the step of block 916 is not needed as the firmware controller 30 does not need to receive the digital control commands 78. In some embodiments, the firmware is configured to perform steps of blocks 902-920, and the step of block 916 is not needed. In some embodiments, the firmware controller 30 may be replaced by a hardware processor/controller, which is configured to perform steps of blocks 902-920, and the step of block 916 is not needed.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and) the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A system, comprising:
- a digitally controlled oscillator (DCO) to generate a local clock signal having a local clock frequency; and
- a hardware clock to maintain a value indicative of a local clock time advancing at a frequency proportional to the local clock frequency of the local clock signal generated by the DCO; and
- clock synchronization circuitry to:
  - receive from a device an indication of a remote clock time;
  - generate a digital control command to at least partially correct for a difference between the remote clock time and the local clock time; and
  - provide the digital control command to the DCO, wherein the DCO is to adjust the local clock frequency responsively to the digital control command.

2. The system according to claim 1, wherein the digital control command indicates a new clock frequency to which to change the local clock frequency by the DCO.

3. The system according to claim 1, wherein the digital control command indicates a frequency adjustment to be made by the DCO to the local clock frequency.

4. The system according to claim 1, wherein the digital control command includes an Inter-Integrated Circuit ($I^2C$) protocol command.

5. The system according to claim 1, wherein in response to the local clock time being less than the remote clock time, the clock synchronization circuitry is to generate:
- a first digital control command to increase the clock frequency from a first frequency X to a second frequency Y; and
- a second digital control command to decrease the clock frequency to a third frequency Z, which is greater than the first frequency X.

6. The system according to claim 1, wherein in response to the local clock time being greater than the remote clock time, the clock synchronization circuitry is to generate:
- a first digital control command to decrease the clock frequency from a first frequency X to a second frequency P; and
- a second digital control command to increase the clock frequency to a third frequency Q, which is less than the first frequency X.

7. The system according to claim 1, wherein the clock synchronization circuitry is to generate the digital control command to at least partially correct for the difference between the remote clock time and the local clock time while limiting an adjustment to the local clock frequency by the DCO.

8. The system according to claim 1, wherein the clock synchronization circuitry is to adjust the value of the hardware clock and/or adjust at least one parameter used to compute the local clock time from the value of the hardware clock responsively to the difference between the remote clock time and the local clock time resulting in a limit being exceeded.

9. The system according to claim 1, wherein the clock synchronization circuitry is to:
- exchange time synchronization packets with the device over a network; and
- generate the digital control command to at least partially correct for the difference between the remote clock time and the local clock time, based on the time synchronization packets.

10. The system according to claim 1, further comprising a pulse per second (PPS) input port to:

receive a PPS signal from the device; and generate a timestamp from the hardware clock responsively to receiving a pulse of the PPS signal, wherein the clock synchronization circuitry is to generate the digital control command to at least partially correct for the difference between the remote clock time and the local clock time, based on the timestamp.

11. The system according to claim 10, wherein the device is a Global Navigation Satellite System (GNSS).

12. The system according to claim 1, further comprising a network device including:

the DCO; and a network interface controller (NIC) application-specific integrated circuit (ASIC).

13. The system according to claim 12, further comprising a host device to connect to the network device, wherein the host device includes at least part of the clock synchronization circuitry to execute software to:

receive from the device the indication of the remote clock time; and generate the digital control command to at least partially correct for the difference between the remote clock time and the local clock time.

14. The system according to claim 12, further comprising a host device to connect to the network device, wherein:

the host device includes a first part of the clock synchronization circuitry to execute software to receive from the device the indication of the remote clock time; and the NIC ASIC includes a second part of the clock synchronization circuitry to execute firmware to generate the digital control command to at least partially correct for the difference between the remote clock time and the local clock time.

15. The system according to claim 12, wherein the NIC ASIC includes the clock synchronization circuitry to execute firmware to:

receive from the device the indication of the remote clock time; and generate the digital control command to at least partially correct for the difference between the remote clock time and the local clock time.

16. The system according to claim 12, wherein the NIC ASIC includes the clock synchronization circuitry to:

receive from the device the indication of the remote clock time; and generate the digital control command to at least partially correct for the difference between the remote clock time and the local clock time.

17. The system according to claim 12, wherein the NIC ASIC includes ports to send packets over a network, wherein DCO is connected to the ports and is to output the local clock signal towards the ports to provide a clock source for the ports.

18. The system according to claim 1, wherein the DCO is a unitary device to:

receive the digital control command; and output the local clock signal with the local clock frequency in response to the digital control command.

19. The system according to claim 18, wherein the DCO is to output the local clock signal with the local clock frequency without receiving an input signal from an oscillator, which is external to the DCO.

20. The system according to claim 1, wherein the DCO is a temperature compensated crystal oscillator (TCXO).

21. The system according to claim 1, wherein the DCO is an oven-controlled crystal oscillator (OCXO).

22. A system, comprising:

a digitally controlled oscillator (DCO) to generate a local clock having a local clock frequency;

a hardware clock to maintain a time-of-day value advancing at a frequency proportional to the local clock frequency of the local clock output by the DCO; and clock synchronization circuitry to:

synchronize the hardware clock to a remote device;

generate a digital control command; and provide the digital control command to the DCO, wherein the DCO is to adjust the local clock frequency responsively to the digital control command.

23. A method, comprising:

generating, by a digitally controlled oscillator (DCO), a local clock signal having a local clock frequency;

maintaining a value indicative of a local clock time advancing at a frequency proportional to the local clock frequency of the local clock signal generated by the DCO;

receiving from a device an indication of a remote clock time;

generating a digital control command to at least partially correct for a difference between the remote clock time and the local clock time;

providing the digital control command to the DCO; and adjusting, by the DCO, the local clock frequency responsively to the digital control command.

* * * * *